United States Patent
Murakami et al.

(10) Patent No.: US 9,891,624 B2
(45) Date of Patent: Feb. 13, 2018

(54) CONTROL UNIT FOR INVERTED PENDULUM VEHICLE

(71) Applicant: HONDA MOTOR CO., LTD., Minato-ku, Tokyo (JP)

(72) Inventors: Hideo Murakami, Wako (JP); Kazumasa Ozaki, Wako (JP); Yui Tadano, Wako (JP); Yoshiki Tatsutomi, Wako (JP); Shinichiro Kobashi, Wako (JP); Makoto Hasegawa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 176 days.

(21) Appl. No.: 14/933,522

(22) Filed: Nov. 5, 2015

(65) Prior Publication Data
US 2016/0129957 A1 May 12, 2016

(30) Foreign Application Priority Data

Nov. 6, 2014 (JP) ................................ 2014-225897

(51) Int. Cl.
*B62D 61/02* (2006.01)
*G05D 1/02* (2006.01)
(Continued)

(52) U.S. Cl.
CPC .............. *G05D 1/02* (2013.01); *B62K 11/007* (2016.11); *G05D 1/0891* (2013.01)

(58) Field of Classification Search
CPC ....... G05D 1/02; G05D 1/0891; B62K 11/007
See application file for complete search history.

(56) References Cited

U.S. PATENT DOCUMENTS 8,678,124 B2    3/2014 Takenaka et al.
9,403,480 B2 *  8/2016 Faeuster ............... B60W 50/16
(Continued)

FOREIGN PATENT DOCUMENTS

JP    2003-502002 A    1/2003
JP    2011-068165 A    4/2011
(Continued)

OTHER PUBLICATIONS

Office Action dated Aug. 22, 2017 in the corresponding Japanese patent application No. 2014-225897 with the English translation thereof.

*Primary Examiner* — Khoi H Tran
*Assistant Examiner* — Robert T Nguyen
(74) *Attorney, Agent, or Firm* — Carrier Blackman & Associates, P.C.; Joseph P. Carrier; Jeffrey T. Gedeon

(57) ABSTRACT

Provided is a control unit for an inverted pendulum vehicle that can warn the vehicle operator by changing the behavior of the vehicle before the upright control of the vehicle fails. The control unit includes a target tilt command computation unit for computing a target tilt command (M_cmd_xy) for the base frame, and an attitude control computation unit for computing a target translational speed (Vw1_*cmd*_xy) for fulfilling the target tilt command. When state information of the vehicle has deviated from a prescribed upright control tolerance range, the target tilt command computation unit generates a tilt command for notification, and superimposes the tilt command for notification (M_xy=M1_*xy*+M2_*xy*) onto the target tilt command.

9 Claims, 17 Drawing Sheets

(51) Int. Cl.
*G05D 1/08* (2006.01)
*B62K 11/00* (2006.01)

(56) References Cited

U.S. PATENT DOCUMENTS

| | | | | |
|---|---|---|---|---|
| 2012/0123647 A1* | 5/2012 | Doi | ............... | B60L 15/20 |
| | | | | 701/49 |
| 2012/0173107 A1* | 7/2012 | Takenaka | ............... | B62K 1/00 |
| | | | | 701/70 |
| 2012/0173114 A1* | 7/2012 | Takenaka | ............... | B62K 1/00 |
| | | | | 701/99 |
| 2012/0175176 A1* | 7/2012 | Hamaya | ............... | B62J 1/005 |
| | | | | 180/21 |
| 2013/0282237 A1* | 10/2013 | Nakamura | ............... | B60G 17/015 |
| | | | | 701/38 |
| 2014/0114559 A1* | 4/2014 | Nakamura | ............... | B62K 3/007 |
| | | | | 701/124 |
| 2015/0231971 A1* | 8/2015 | Taira | ............... | B60L 3/0084 |
| | | | | 701/22 |

FOREIGN PATENT DOCUMENTS

| | | |
|---|---|---|
| JP | 2012-136207 A | 7/2012 |
| JP | 2012-240484 A | 12/2012 |
| JP | 2013-237325 A | 11/2013 |
| WO | 00/75001 A1 | 12/2000 |

* cited by examiner

*Fig.8*

| | gravitational center deviation influence amount Vofs_xy | value to be added (Vb_cmd_xy) | value to be subtracted (-Vofs_xy) | gravitational center deviation compensated gravitational center target speed Vb_cmpn_cmd_xy |
|---|---|---|---|---|
| A (dead zone) | 0.5 | 0 | −0.5 | −0.5 |
| | 1.0 | 0 | −1.0 | −1.0 |
| B (intermediate region) | 1.5 | 0.5 | −1.5 | −1.0 |
| | 2.0 | 1.0 | −2.0 | −1.0 |
| C (saturation region) | 2.5 | 1.0 | −2.5 | −1.5 |
| | 3.0 | 1.0 | −3.0 | −2.0 |
| | ⋮ | ⋮ | ⋮ | ⋮ |

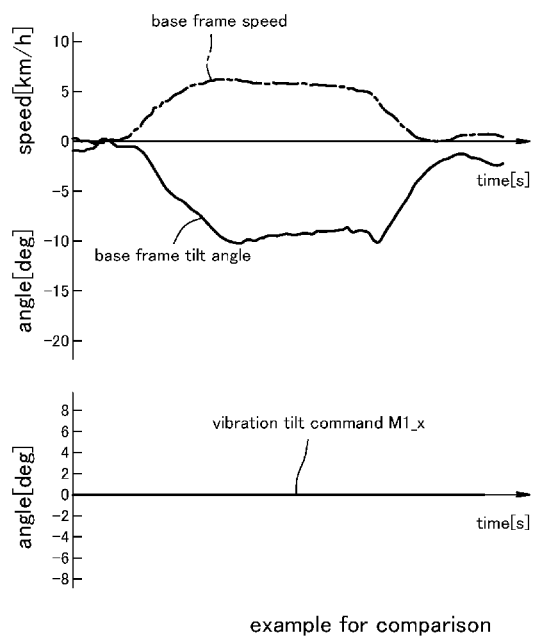 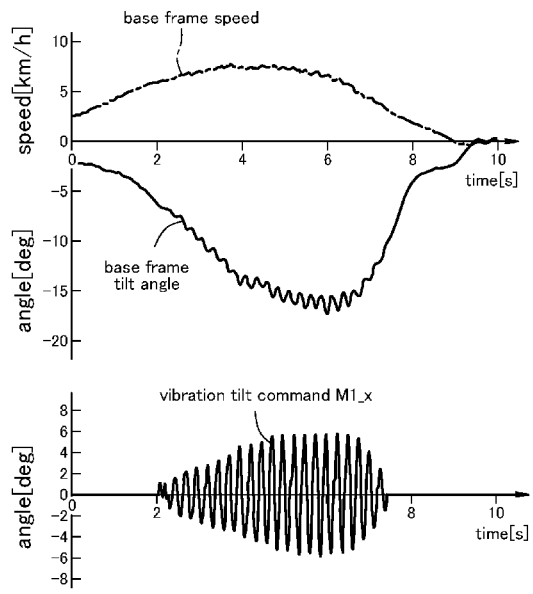
example for comparison
Fig. 15A
present invention
Fig. 15B

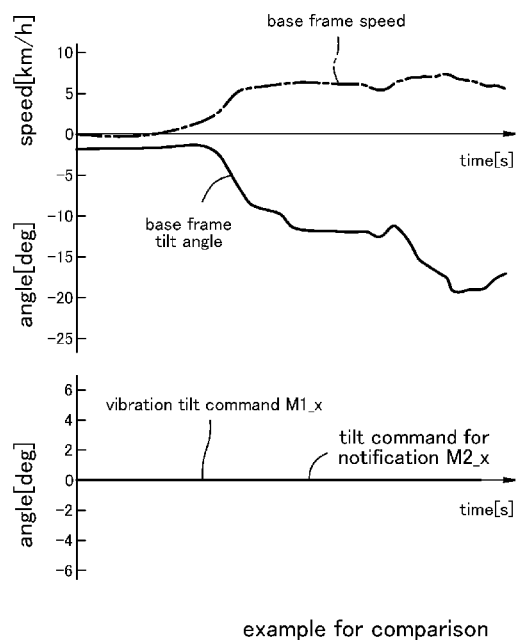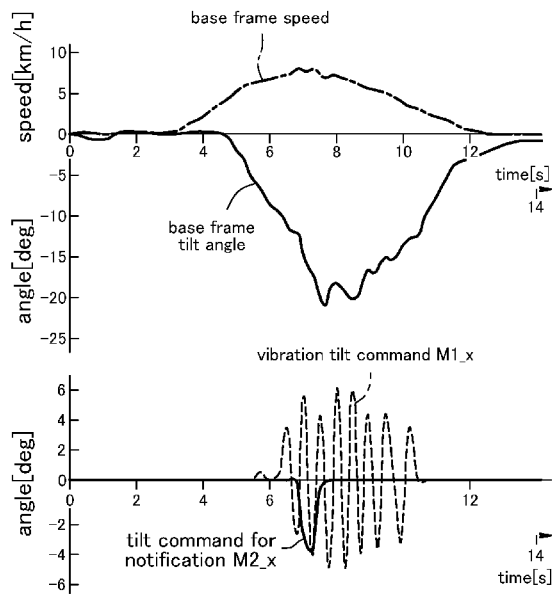
example for comparison
present invention
*Fig. 16A*
*Fig. 16B*

CONTROL UNIT FOR INVERTED PENDULUM VEHICLE

TECHNICAL FIELD

The present invention relates to a control unit for an inverted pendulum vehicle which can provide a notification or a warning to a vehicle operator by changing the behavior of the vehicle.

BACKGROUND ART

Conventionally known is an inverted pendulum vehicle having a saddle unit provided on a base frame including a motion unit for propelling the vehicle on a floor surface and a drive unit for driving the motion unit, and configured to be propelled in a desired direction as commanded by the vehicle operator by leaning toward the desired direction. See JP2011-068165A and JP2013-237325A, for instance.

Such an inverted pendulum vehicle is typically configured to travel faster as the vehicle operator leans more heavily toward the desired direction as long as the leaning angle is within a prescribed range. If the leaning angle is excessive, the drive torque and/or the travel speed that are necessary to control the vehicle in the upright attitude may not be available so that the vehicle operator may have some difficulty in maintaining the upright posture of the vehicle. Therefore, it is necessary to provide a certain mechanism that limits the leaning angle of the vehicle operator within an upright control tolerance range by notifying or warning the vehicle operator. For instance, when the vehicle operator has leaned toward the desired direction by an excessive degree, the vehicle may be tilted in the opposite direction to prevent the leaning angle of the vehicle operator from becoming excessive, or a warning may be issued to the vehicle operator to desist from leaning excessively.

Even when the system warns the vehicle operator not to lean excessively by tilting the vehicle in the opposite direction or issuing a warning, the vehicle may still cause some difficulty for the vehicle operator to maintain the upright posture unless the vehicle operator heeds such a warning and takes an appropriate action. When the vehicle happens to be in a noisy environment, the vehicle operator may fail to notice the warning given as an audible warning.

SUMMARY OF THE INVENTION

In view of such recognition of the inventors and the problems of the prior art, a primary object of the present invention is to provide a control unit for an inverted pendulum vehicle that can urge the vehicle operator to take an appropriate action by changing the behavior of the vehicle when the vehicle operator is operating the vehicle in an improper manner.

A second object of the present invention is to provide a control unit for an inverted pendulum vehicle that can warn the vehicle operator by changing the behavior of the vehicle before the upright control of the vehicle fails.

Such an object can be accomplished by providing a control unit (20) for an inverted pendulum vehicle (1) that includes a base frame (2) and a motion unit (3) configured to travel on a floor surface and supporting the base frame, the control unit comprising: a state information acquiring unit (70, 71, 72) for acquiring state information of the vehicle; and a control process unit (24) for controlling the motion unit according to the state information acquired by the state information acquiring unit; wherein the control process unit includes a target tilt command computation unit (35) for computing a target tilt command ($M\_cmd\_xy$) for the base frame, and an attitude control computation unit (34) for computing a target translational speed ($Vw1\_cmd\_xy$) for fulfilling the target tilt command; and when the state information has deviated from a prescribed upright control tolerance range (R), the target tilt command computation unit generates a tilt command for notification, and superimposes the tilt command for notification ($M\_xy=M1\_xy+M2\_xy$) onto the target tilt command.

In this arrangement, because when the state information of the vehicle has deviated from the prescribed upright control tolerance range, the tilt command for notification is superimposed on the target tilt command, and this is manifested as a change in the tilt angle of the base frame via a change in the translational speed so that the vehicle operator is appropriately notified before the upright control of the vehicle is jeopardized.

According to a certain aspect of the present invention, the target tilt command computation unit generates the tilt command for notification ($M1\_xy$) in a manner corresponding to a deviation amount of the acquired state information from the upright control tolerance range.

In this arrangement, because a change in the tilt angle occurs to the base frame in dependence on the deviation of the state information of the vehicle from the upright control tolerance range, the vehicle operator is appropriately notified before the upright control of the vehicle is jeopardized.

According to another aspect of the present invention, the target tilt command computation unit generates the tilt command for notification ($M1\_xy$) as a tilt vibration of an amplitude ($G1\_x$) proportional to the deviation amount of the acquired state information from the upright control tolerance range.

In this arrangement, because the tilt vibration of an amplitude proportional to the deviation amount of the acquired state information from the upright control tolerance range is caused to the base frame, the vehicle operator can be notified even with a small change in the tilt angle. The term "proportional" as used herein should be interpreted as being not limited to a linear relationship but in a broader sense.

According to yet another aspect of the present invention, the target tilt command computation unit generates the tilt command for notification ($M1\_xy$) as a sinusoidal tilt vibration (S) of a prescribed frequency.

In this arrangement, the tilt vibration can be applied to the base frame without causing discomfort to the vehicle operator as it consists of a sinusoidal tilt vibration.

According to yet another aspect of the present invention, the state information includes at least one of a traveling speed ($Vb\_estm1\_xy$) of the vehicle, a tilt angle of the base frame ($\theta b\_act\_xy$) and an operation speed ($Nm\_xy$) of the motion unit, and the target tilt command computation unit starts superimposing the tilt command for notification ($M1\_xy$) onto the target tilt command when at least one of the traveling speed of the vehicle (ST2), the tilt angle of the base frame and the operation speed of the motion unit has deviated from a prescribed corresponding upright control tolerance range (ST1: Yes).

In this arrangement, the vehicle operator can be notified before the soundness of the control is jeopardized based on at least one of the factors that indicate a difficulty in maintaining the upright control.

According to yet another aspect of the present invention, the state information includes at least two of a traveling speed of the vehicle ($Vb\_estm1\_xy$), a tilt angle of the base frame (θb_act_xy) and an operation speed (Nm_xy) of the motion unit, and the target tilt command computation unit ceases superimposing the tilt command for notification (M1_xy) onto the target tilt command when all of the at least two of the traveling speed of the vehicle, the tilt angle of the base frame and the operation speed of the motion unit have ceased to deviate from prescribed corresponding upright control tolerance ranges (ST1: No).

When it has become difficult to maintain the upright control owing to a certain variable, this variable may later return to the corresponding tolerance range owing to the notification to the vehicle operator, but the upright control may still not be resumed in a proper manner owing to another variable. This arrangement allows the control device to correctly continue the notification to the vehicle operator even in such a case.

According to yet another aspect of the present invention, the target tilt command computation unit generates the tilt command for notification (M2_xy) as a command to tilt the base frame by a prescribed angle (−6 degrees) in the opposite direction to the traveling direction of the vehicle.

In this arrangement, the vehicle operator can be notified in a reliable manner by tilting the base frame by a relatively large angle.

According to yet another aspect of the present invention, the state information includes a tilt angular acceleration (α_x) of the base frame, and wherein when the tilt angular acceleration of the base frame has deviated from a prescribed upright control tolerance range (ST11: Yes), the target tilt command computation unit generates the tilt command for notification (ST12) such that the tilting of the base frame by the prescribed angle (−6 degrees) occurs with a delay of a prescribed time constant (0.1 sec), and when the tilt angle of the base frame has reached the prescribed angle, the target tilt command computation unit generates the tilt command for notification such that the tilting of the base frame may be returned to an original angle with a delay of a prescribed time constant (0.05 sec).

In this arrangement, the vehicle operator can be notified in a reliable manner and in a relatively short time with the tilting of the base frame at a moderate speed that does not alarm the vehicle operator to such an extent as to lose composure.

According to yet another aspect of the present invention, the attitude control computation unit computes the target translational speed such that a gravitational center target speed (Vb_cmpn_cmd_xy) computed by the control process unit as well as the target tilt angle command may be achieved, and the control process unit sets the gravitational center target speed (ST22) such that the tilt angle of the base frame becomes zero when the tilt angle of the base frame has reached the prescribed stopper angle (−25 degrees) (ST21: Yes).

In this arrangement, the gravitational center target speed is determined such that the tilt angle of the base frame is zero owing to the attitude control by the attitude control computation unit, and the target translational speed is set so as to achieve this. Thereby, the base frame which has tilted to the stopper angle is enabled to quickly recover from this state.

According to yet another aspect of the present invention, when the tilt angle of the base frame has reached a prescribed stopper angle (−25 degrees) (ST21: Yes), the attitude control computation unit determines the gravitational center target speed (Vb_cmpn_cmd_xy) so as to put the tilt angle of the base frame back to zero with a time delay of a prescribed time constant (0.3 sec), and upon setting of the gravitational center target speed by the control process unit to put the tilt angle of the base frame back to an original angle, the attitude control computation unit determines the gravitational center target speed (ST24) so as to put the tilt angle of the base frame back to the original angle with a time delay of a prescribed time constant (0.3 sec) (ST24).

Thereby, the movement of the base frame can be made smooth, in particular when the base frame returns to the original angle by the tilt command for notification, According to the present invention, the vehicle behavior is modified before the soundness of the upright control is jeopardized so that the vehicle operator may be notified of any potential risk in maintaining the upright control before such a risk is materialized.

The present invention thus provides a control unit for an inverted pendulum vehicle that can urge the vehicle operator to take an appropriate action by changing the behavior of the vehicle before the upright control gets out of control for the vehicle operator.

BRIEF DESCRIPTION OF THE DRAWINGS

FIG. 8 is a table for computing the gravitational center target speed with the attitude control computation unit shown in FIG. 4;

FIGS. 15A and 15B are graphs demonstrating the effect accomplished by the process of the first control process unit shown in FIG. 4;

FIGS. 16A and 16B are graphs demonstrating the effect accomplished by the process of the second notification function unit shown in FIG. 4.

DETAILED DESCRIPTION OF THE PREFERRED EMBODIMENT(S)

Figure 1:
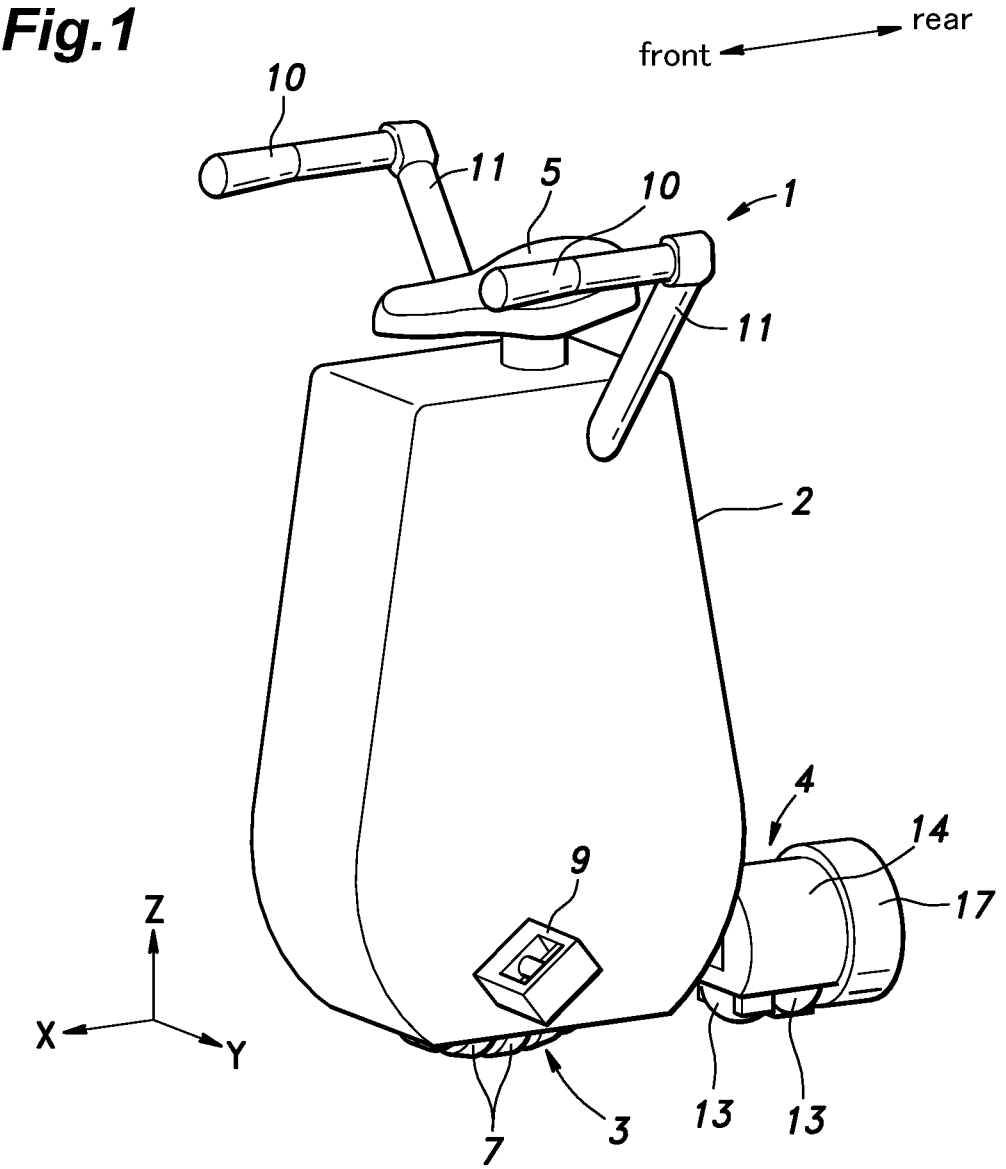
FIG. 1 is a perspective view of an inverted pendulum vehicle given as a first embodiment of the present invention.
Figure 2:
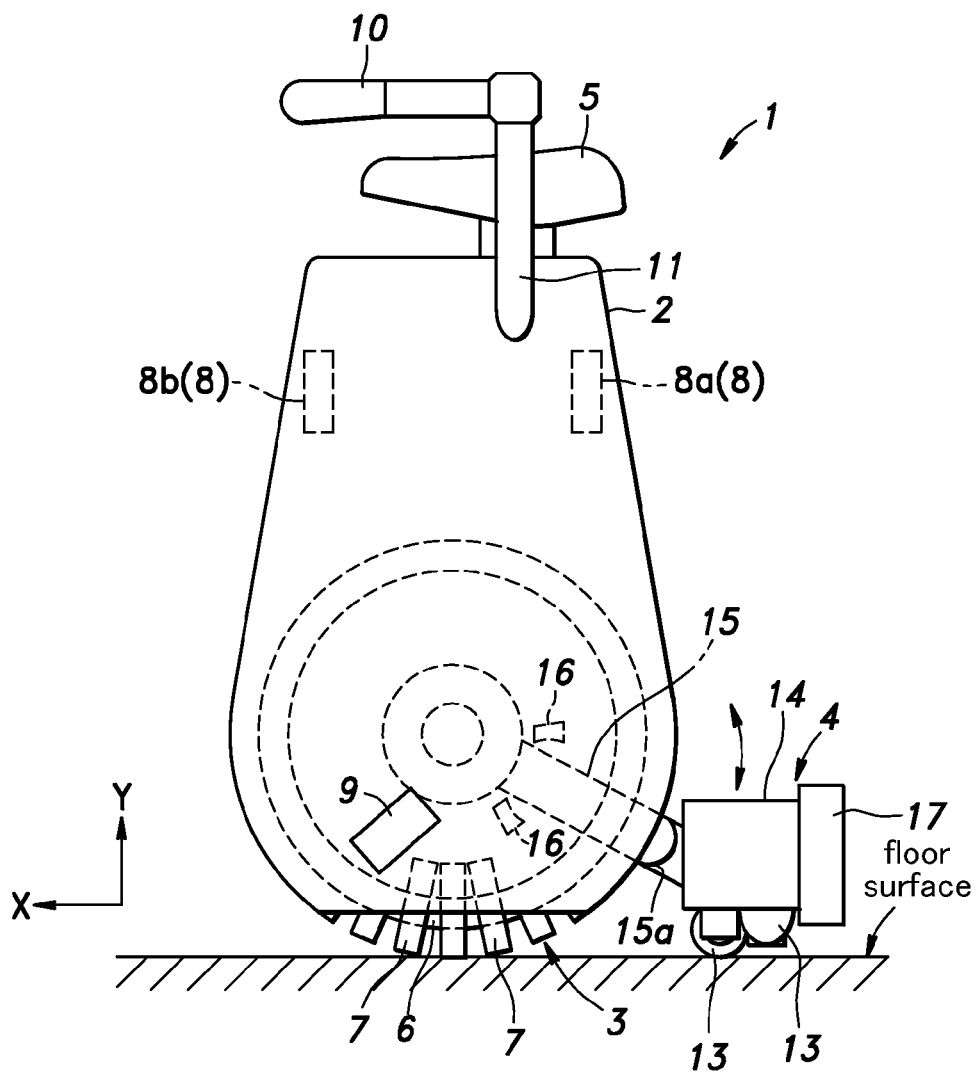
FIG. 2 is a side view of the inverted pendulum vehicle.

An embodiment of the present invention is described in the following with reference to FIGS. 1 to 17. As shown in FIGS. 1 and 2, the inverted pendulum vehicle (referred to simply as "vehicle 1" in the following description) of the illustrated embodiment comprises a base frame 2 (or a vehicle body or a machine body), a first motion unit 3 and a second motion unit 4 attached to the base frame 2 for propelling the vehicle 1 on a floor surface and a saddle unit 5 provided atop the base frame 2.

The first motion unit 3 is provided with an annular core 6 shown in FIG. 2 and a plurality of annular rollers 7 fitted on the annular core 6 at a regular angular interval. Each roller 7 is fitted on the annular core 6 with the axial line of the rollers 7 aligned with the circumferential direction of the annular core 6. The rollers 7 are rotatable with the annular core 6 around the rotational center line of the annular core 6 and are each rotatable around the central axial line of the annular core 6 (circumferential axial line centered around the annular core 6).

The first motion unit 3 provided with the annular core 6 and the rollers 7 is configured to operate with the rotational center line of the annular core 6 oriented in parallel with the floor surface and the rollers 7 (in particular the rollers 7 located in the lower part of the annular core 6) placed in contact with the floor surface. Under this condition, when the annular core 6 is rotatively actuated around the rotational center line thereof, and the annular core 6 and the rollers 7 are rotated as a single body, the first motion unit 3 is propelled on the floor surface in the direction perpendicular to the rotational center line of the annular core 6 (or in the fore and aft direction). Also, under this condition, when the rollers 7 are rotatively actuated around their respective rotational center lines (circumferential central axial line of the annular core 6), the first motion unit 3 is propelled in the direction of the rotational center line of the annular core 6 (or in the lateral direction). By simultaneously causing the rotation of the annular core 6 and the rotation of each individual roller 7, the first motion unit 3 is enabled to move in any direction at an angle to the direction of the axial center line of the annular core 6 or the direction perpendicular thereto.

Thereby, the first motion unit 3 is able to travel in any direction on the floor. In the following description, the traveling direction of the first motion unit 3 is defined such that the direction perpendicular to the rotational center line of the annular core 6 is the X axis direction, the direction of the rotational center line of the annular core 6 is the Y axis direction, and the (plumb) vertical direction is the Z axis direction. The forward direction is the positive direction of the X axis, the leftward direction is the positive direction of the Y axis, and the upward direction is the positive direction of the Z axis.

The first motion unit 3 is mounted to the base frame 2. More specifically, the base frame 2 substantially entirely covers the first motion unit 3 except for the lower part of the first motion unit 3 engaging the floor surface. The annular core 6 of the first motion unit 3 is rotatable around the rotational center line thereof in this assembled state. The base frame 2 is not only pivotable around the rotational center line (Y axis) of the annular core 6 of the first motion unit 3 but also able to tilt, along with the first motion unit 3, about the point of ground contact of the first motion unit 3 around the X axis which is perpendicular to the rotational center line of the annular core 6. Therefore, the base frame 2 is able to tilt with respect to the vertical line around the two axial lines (X and Y axes).

As shown in FIG. 2, a first drive unit 8 is installed in the base frame 2 to drive the first motion unit 3. The first drive unit 8 includes an electric motor 8a serving as a drive source to rotatively drive the annular core 6 and an electric motor 8b serving as a drive source to rotatively drive the rollers 7. The power from these electric motors 8a and 8b is transmitted to the annular core 6 and the rollers 7 via corresponding power transmission mechanisms which are not shown in the drawings and may consist of per se known arrangements.

The first motion unit 3 may also consist of a different structure from that discussed above. For instance, the first motion unit 3 and the drive system thereof may be based on the structures proposed in WO2008/132778A and WO2008/132779 filed by the same applicant as the present application.

The saddle unit 5 including a seat for a vehicle operator to sit on is fixedly mounted on the upper end of the base frame 2. The saddle unit 5 is configured to seat a vehicle operator or a vehicle occupant with the fore and aft direction directed in the direction of the X axis and the lateral direction directed in the direction of the Y axis. Because the saddle unit 5 is fixedly attached to the base frame 2, the saddle unit 5 tilts with respect to the vertical direction in a single body with the base frame 2.

The base frame 2 is additionally fitted with a pair of foot rests 9 for the vehicle operator seated on the saddle unit 5 to place his or her feet on and a pair of handles 10 for the vehicle operator to grab onto. The foot rests 9 project from either lateral side of a lower part of the base frame 2. In FIGS. 1 and 2, one of the foot rests (the one on the right side) 9 is hidden in the illustration. The handles 10 consist of bars extending in the X axis direction (in the fore and aft direction) on either side of the saddle unit 5 in mutually spaced apart relationship, and are fixedly secured to the base frame 2 via a pair of rods 11 extending from the base frame 2.

The second motion unit 4 of the illustrated embodiment is constructed as an omni-wheel. The second motion unit 4 includes a pair of identical annular cores (not shown in the drawings) arranged in a coaxial manner one behind the other and a plurality of barrel-shaped rollers 13 rotatably fitted onto the annular cores each with the central axial line thereof aligned with the circumferential direction of the annular core in a freely rotatable manner.

The second motion unit 4 is arranged to the rear of the first motion unit 3 with the common axial line of the annular cores directed in the X axis direction (in the fore and aft direction) so that the rollers 13 are grounded on the floor surface.

The rollers 13 fitted on one of the annular cores are circumferentially shifted or offset from those on the other annular core so that as the annular cores rotate, either one of the rollers 13 on the one annular core or one of the rollers 13 on the other annular core engages the floor surface.

The second motion unit 4 is connected to the base frame 2. More specifically, the second motion unit 4 includes a housing 14 covering the upper part of the omni-wheel (the two annular cores and the rollers 13 fitted thereon) and rotatably supporting the two annular cores around the center line thereof, and an arm 15 extending from the housing 14 is pivotally connected to the base frame 2 such that the arm 15 is rotatable around the central line of the annular core 6 of the first motion unit 3.

Thus, the second motion unit 4 is rotatable around the central line of the annular core 6 of the first motion unit 3 via the pivotal movement of the arm 15 so that the saddle unit 5, along with the base frame 2, can be tilted around the Y axis while the first motion unit 3 and the second motion unit 4 are both grounded.

Alternatively, the arm 15 may be pivotally connected to the central shaft of the annular core 6 of the first motion unit 3 while the second motion unit 4 is connected to the first motion unit 3 via the arm 15. The second motion unit 4 may be biased by a spring or the like to be resiliently pushed against the floor surface.

The base frame 2 is provided with a pair of stoppers 16 to limit the range in which the arm 15 can pivot so that the arm 15 can swing within an angle defined by the two stoppers 16. Therefore, the rotational range of the second motion unit 4 around the central line of the annular core 6 of the first motion unit 3 and, hence, the range of the tilting movement of the base frame 2 and the saddle unit 5 around the Y axis is limited such that the base frame 2 and the saddle unit 5 are prevented from excessively tilting in the rearward direction with the vehicle operator seated on the saddle unit 5. In the illustrated embodiment, when the base frame 2 has fully tilted in the rearward direction until the arm 15 is engaged by the upper stopper 16, the angle of the base frame 2 is −25 degrees.

The arm 15 includes two arm members that are pivotally connected to each other by an elbow bend 15a that is located in a part of the arm projecting from the base frame 2 and includes a pivot shaft extending in the Y axis direction, and the two arm members are urged by a spring member into a linearly aligned condition. When the base frame 2 has tilted rearward until the arm 15 is engaged by the upper stopper 16, owing to the pivotal action of the middle part of the arm 15 at the elbow bend 15a, the base frame 2 is allowed to tilt further rearward. Once the bending angle of the arm 15 at the elbow bend 15a reaches a certain value, a part of the second motion unit 4 other than the rollers 13 is grounded so that any further rearward tilting of the base frame 2 is prevented.

As discussed earlier, owing to the rotation of the annular cores and/or the rotation of the rollers 13, similarly as the first motion unit 3, the second motion unit 4 is able to move in all directions including the X axis direction and the Y axis direction. More specifically, the second motion unit 4 is able to move in the Y axis direction (lateral direction) owing to the rotation of the annular cores, and in the X axis direction (fore-and-aft direction) owing to the rotation of the rollers 13.

The housing 14 of the second motion unit 4 is provided with an electric motor 17 serving as a second drive unit for driving the second motion unit 4. This electric motor 17 is connected to the annular cores to rotatively actuate the annular cores.

Thus, in the illustrated embodiment, the movement of the second motion unit 4 in the X axis direction is performed in a passive manner by following the motion of the first motion unit 3 in the X axis direction. The movement of the second motion unit 4 in the Y axis direction is performed by rotatively actuating the annular cores of the second motion unit 4 by using the electric motor 17.

The mechanical structure of the vehicle 1 of the illustrated embodiment has been described.

Figure 3:
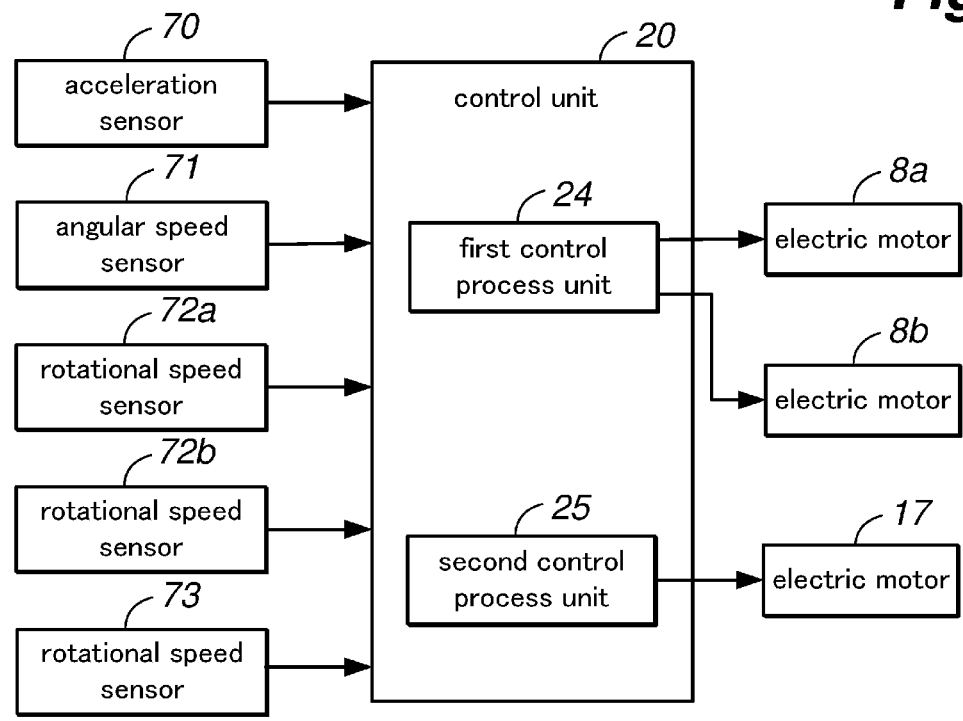
FIG. 3 is a block diagram of the control unit for the inverted pendulum vehicle.

As shown in FIGS. 1 and 2, a control unit 20 is provided in the base frame 2 of the vehicle 1 to control the first motion unit 3 and the second motion unit 4. As shown in FIG. 3, the control unit 20 is constructed as an electronic circuit unit including a CPU, RAM and ROM. The vehicle 1 is additionally provided with an acceleration sensor 70 for detecting the acceleration of the base frame 2 along three axial lines (X, Y and Z) of the base frame 2, an angular speed sensor 71 (such as a gyro sensor) for detecting the angular speed of the base frame 2 around the three axial lines (X, Y and Z) of the base frame 2, a rotational speed sensor (such as a rotary encoder) 72a for detecting the rotational speed Nm_x of the electric motor 8a, a rotational speed sensor 72b for detecting the rotational speed Nm_y of the electric motor 8b, and a rotational speed sensor 73 for detecting the rotational speed Nm_c of the electric motor 17.

The control unit 20 receives detection signals from the acceleration sensor 70, the angular speed sensor 71, the rotational speed sensor 72a, the rotational speed sensor 72b and the rotational speed sensor 73.

The control unit 20 acquires the measurement value of the tilt angle of the base frame 2 from the detection signals of the acceleration sensor 70 and the angular speed sensor 71 in a per se known manner, for instance as disclosed in JP4181113B filed by the same applicant.

More specifically, the tilt angle of the base frame 2 is defined as the angle of line passing though the gravitational center of the vehicle 1 including a vehicle operator seated on the vehicle 1 in a standard posture and the ground contact point of the first motion unit 3 with respect to the (plumb) vertical line passing through the ground contact point. In practice, this angle is given as a combination of the tilt angle around the Y axis and the tilt angle around the Z axis.

Based on the detection signal of the angular speed sensor 71, the control unit 20 acquires the angular speed of the vehicle 1 around the yaw axis thereof.

The control unit 20 performs various functions by executing a computer program incorporated therein, and such functions include a first control process unit 24 for controlling the first motion unit 3 by controlling the electric motors 8a and 8b forming the first drive unit 8 and a second control process unit 25 for controlling the second motion unit 4 by controlling the electric motor 17 forming the second drive unit.

The first control process unit 24 computes, by executing a computing process which will be described hereinafter, a first target speed (a combination of the speed in the X axis direction and the speed in the Y axis direction) for the first motion unit 3 at a prescribed interval, and controls the rotational speed Nm_xy of the electric motors 8a and 8b so that the actual traveling speed of the first motion unit 3 coincides with the first target speed. In this disclosure, it should be noted that the variables concerning the behavior along the X axis and the variable concerning the behavior along the Y axis are sometimes commonly denoted with variables with a suffix "_xy".

In practice, because the relationship between the rotational speeds Nm_xy of the electric motors 8a and 8b and the traveling speed of the first motion unit 3 is known in advance, the target values for the rotational speeds Nm_xy of the electric motors 8a and 8b corresponding to the target traveling speed of the first motion unit 3 are used for the actual computation. The first control unit 24 controls the actual traveling speed of the first motion unit 3 so as to be equal to the first target speed by performing a feedback control on the rotational speeds Nm_xy of the electric motors 8a and 8b so as to be equal to certain target values corresponding to the first target speed.

The second control process unit 25 computes, by executing a computing process which will be described hereinafter, a second target speed (the speed in the Y axis direction) for the second motion unit 4 at a prescribed interval, and controls the rotational speed Nm_c of the electric motor 17 so that the actual traveling speed of the second motion unit 4 coincides with the second target speed.

Similarly as in the case of the first motion unit 3, because the relationship between the rotational speeds Nm_c of the electric motor 17 and the traveling speed of the second motion unit 4 in the Y axis direction is known in advance, the target value for the rotational speed Nm_c of the electric motor 17 corresponding to the target traveling speed of the second motion unit 4 is used for the actual computation. The second control process unit 25 controls the actual traveling speed of the second motion unit 4 so as to be equal to the second target speed by performing a feedback control on the rotational speed Nm_c of the electric motor 17 so as to be equal to a certain target value corresponding to the second target speed.

In the illustrated embodiment, because the movement of the second motion unit 4 in the X axis direction is caused passively by following the movement of the first motion unit 3, there is no need to set a target value for the traveling speed of the second motion unit 4 in the X axis direction.

In the following description, the speed of the first motion unit 3 means the speed of the ground contact point of the first motion unit 3 unless otherwise indicated. Likewise, the speed of the second motion unit 4 means the speed of the ground contact point of the second motion unit 4 unless otherwise indicated.

The processes that are carried out in the first control process unit 24 and the second control process unit 25 are described in the following with a greater detail. The process carried out in the first control process unit 24 is described at first with reference to FIGS. 4 to 14.

Figure 4:
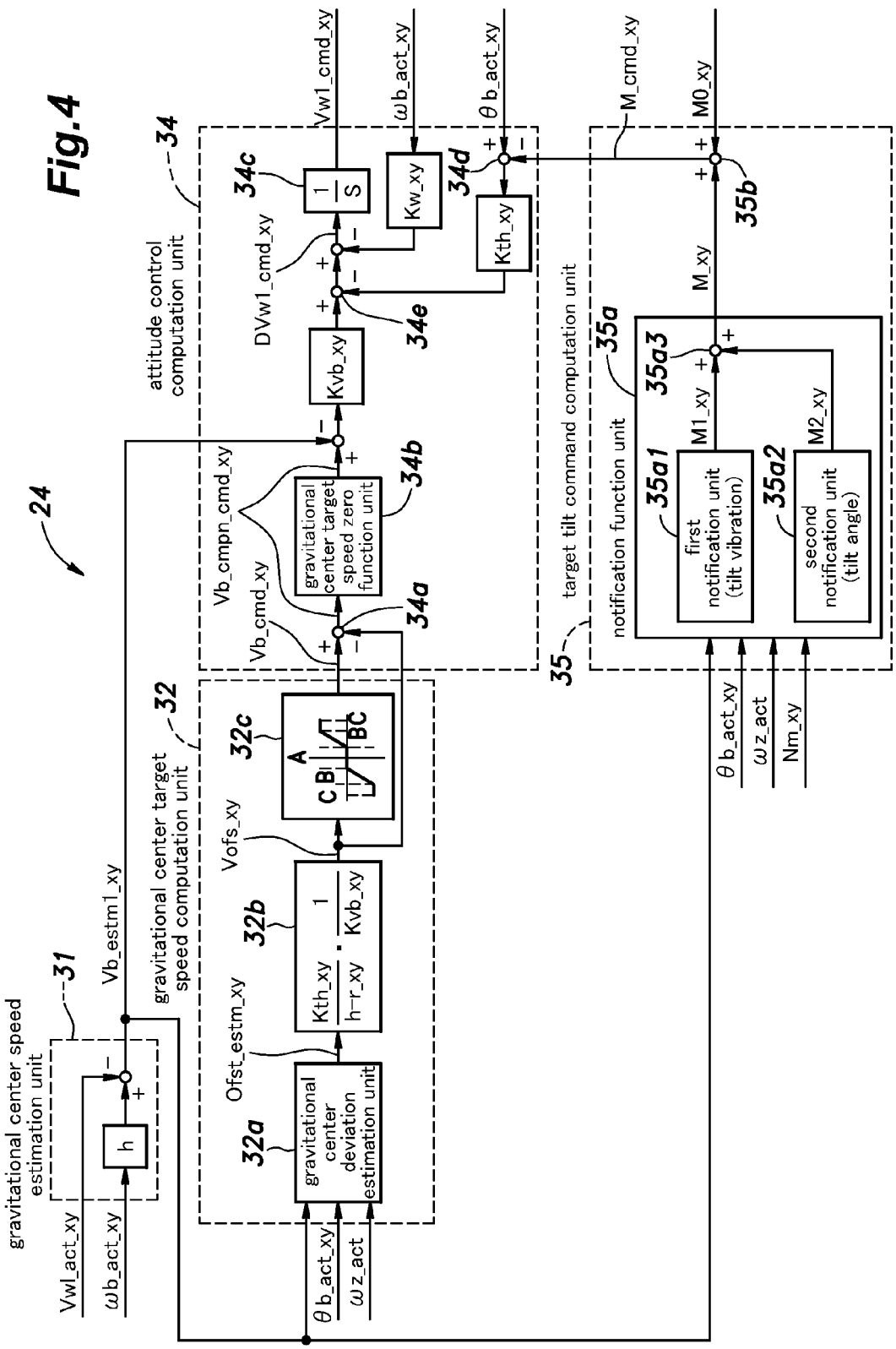
FIG. 4 is a block diagram showing the process carried out by the first control process unit shown in FIG. 3.

As shown in FIG. 4, the first control process unit 24 includes a gravitational center speed estimation unit 31 for estimating the speed of the gravitational center of the vehicle as a whole including the vehicle 1 itself and the vehicle operator (overall gravitational center of the vehicle), a gravitational center target speed computation unit 32 for determining a target speed of the overall gravitational center of the vehicle, an attitude control computation unit 34 for determining a target value of the traveling speed of the first motion unit 3 that is required to maintain the attitude of the base frame 2 in a stable manner while causing the estimated traveling speed of the first motion unit 3 to follow the target speed, and a target tilt command computation unit 35 for determining a target tilt command value M_cmd_xy that is given as a target value for the tilt angle of the base frame 2 that is used when the attitude control computation unit 34 determines the target value of the traveling speed of the first motion unit 3. The first control process unit 24 performs the functions of these function units at a prescribed computation cycle of the control unit 20.

The overall gravitation center of the vehicle may mean any representative point of the vehicle. Therefore, the speed of the overall gravitation center of the vehicle means the translational speed of such a point.

Before specifically discussing the processes carried out by the various function units of the first control process unit 24, some basic matters should be discussed. The dynamic behavior (as seen in both the X axis direction and the Y axis direction) of the overall gravitational center of the vehicle may be approximately represented by an inverted pendulum model shown in FIG. 5. The process algorithm of the first control process unit 24 is based on this model.

Figure 5:
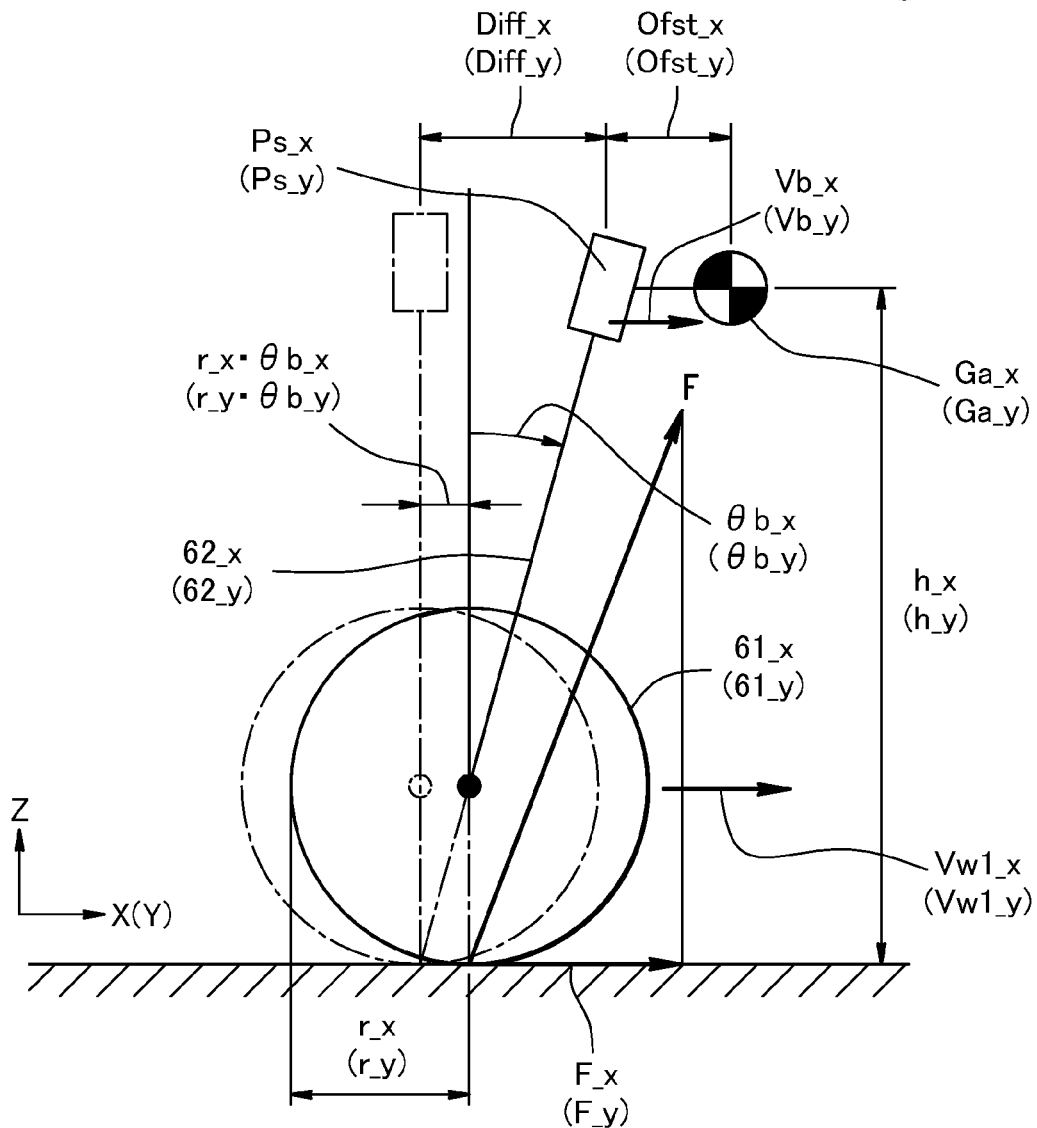
FIG. 5 is a diagram showing an inverted pendulum model used in the process carried out by the first control process unit shown in FIG. 3.

The reference numerals, including those in FIG. 5, may include a suffix "_x" which means that the variable is measured along the X axis (as seen from the direction of the Y axis), and a suffix "_y" which means that the variable is measured along the Y axis (as seen from the direction of the X axis). In FIG. 5, to show the inverted pendulum model as seen along both the X axis direction and the Y axis direction, the variables in the brackets indicate the variables as seen along the X axis direction and the variables without a bracket indicate the variables as seen along the Y axis direction.

The inverted pendulum model representing the behavior of the overall gravitational center of the vehicle as seen along the X axis direction includes a hypothetical wheel 61_x that has a rotational center line in parallel with the Y axis and can roll on the floor surface, a rod 62_x that extends from the rotational center line of the hypothetical wheel 61_x and rotatable around the rotational center line of the hypothetical wheel 61_x (around the Y axis), and a mass Ga_x attached to a reference point Ps_x defined at the opposite end (upper end) of the rod 62_x.

In this inverted pendulum model, the movement of the mass Ga_x corresponds to the movement of the overall gravitational center of the vehicle as seen along the X axis direction, and the tilt angle $\theta b\_x$ of the rod 62_x with respect to the (plumb) vertical direction corresponds to the tilt angle of the base frame 2 around the Y axis. The translational movement of the first motion unit 3 along the X axis direction corresponds to the translational movement of the hypothetical wheel 61_x in the X axis direction caused by the rolling movement thereof.

The radius r_x of the hypothetical wheel 61_x and the height h_x of the reference point Ps_x and the mass Ga_x from the floor surface are predetermined fixed values.

The inverted pendulum model representing the behavior of the overall gravitational center of the vehicle as seen along the Y axis direction includes a hypothetical wheel 61_y that has a rotational center line in parallel with the X axis and can roll on the floor surface, a rod 62_y that extends from the rotational center line of the hypothetical wheel 61_y and rotatable around the rotational center line of the hypothetical wheel 61_y (around the X axis), and a mass Ga_y attached to a reference point Ps_y defined at the opposite end (upper end) of the rod 62_y.

In this inverted pendulum model, the movement of the mass Ga_y corresponds to the movement of the overall gravitational center of the vehicle as seen along the Y axis direction, and the tilt angle $\theta b\_y$ of the rod 62_y with respect to the (plumb) vertical direction corresponds to the tilt angle of the base frame 2 around the X axis. The translational movement of the first motion unit 3 in the Y axis direction corresponds to the translational movement of the hypothetical wheel 61_y along the Y axis direction caused by the rolling movement thereof.

The radius r_y of the hypothetical wheel 61_y and the height h_y of the reference point Ps_y and the mass Ga_y from the floor surface are predetermined fixed values. The height h_y of the reference point Ps_y and the mass Ga_y from the floor surface as seen along the Y axis direction is the same as the height h_x of the reference point Ps_x and the mass Ga_x from the floor surface as seen along the X axis direction, respectively. Therefore, h_y=h_x=h.

Some additional discussion on the positional relationship between the reference point Ps_x and the mass Ga_x as seen along the Y axis direction may be helpful. The reference point Ps_x is the position of the overall gravitational center of the vehicle when the vehicle operator is seated on the saddle unit 5 and remains stationary at a prescribed neutral position with respect to the saddle unit 5 (base frame 2). Therefore, in this case, the reference point Ps_x coincides with the mass Ga_x.

A similar discussion applies to the positional relationship between the reference point Ps_y and the mass Ga_y as seen along the Y axis direction When the vehicle operator seated on the saddle unit 5 leans over in a certain direction with respect to the base frame 2 (or the saddle unit 5), the overall gravitational center of the vehicle shifts laterally from the original position of the reference point Ps_x, Ps_y. The vehicle is configured to travel in the direction in which the vehicle operator leans over. In the state shown in FIG. 5, the mass Ga_x, Ga_y is deviated from the reference point Ps_x, Ps_y.

The behavior of the overall gravitational center of the vehicle represented by the inverted pendulum model is expressed by Equations 1a, 1b, 2a and 2b given in the following. Equations 1a and 1b correspond to the behavior of the vehicle as seen along the X axis direction, and Equations 2a and 2b correspond to the behavior of the vehicle as seen along the Y axis direction.

$$Vb\_x = Vw1\_x + h \cdot \omega b\_x \tag{1a}$$

$$dVb\_x/dt = (g/h) \cdot (\theta b\_x \cdot (h - r\_x) + Ofst\_x) + \omega z \cdot Vb\_y \tag{1b}$$

$$Vb\_y = Vw1\_y + h \cdot \omega b\_y \tag{2a}$$

$$dVb\_y/dt = (g/h) \cdot (\theta b\_y \cdot (h - r\_y) + Ofst\_y) - \omega z \cdot Vb\_x \tag{2b}$$

where

Vb_x is the speed (translational speed) of the overall gravitational center of the vehicle along the X axis direction, θb_x is the tilt angle of the base frame 2 around the Y axis, Vw1_x is the speed (translational speed) of the hypothetical wheel 61_x along the X axis direction, ωb_x is the time differential (dθb_x/dt) of θb_x, Ofst_x is the deviation of the overall gravitational center of the vehicle (the position of the mass Ga_x along the X axis direction) from the position of the reference point Ps_x along the X axis direction, Vb_y is the speed (translational speed) of the overall gravitational center of the vehicle along the Y axis direction, Vw1_y is the speed (translational speed) of the hypothetical wheel 61_y along the Y axis direction, θb_y is the tilt angle of the base frame 2 around the X axis, ωb_y is the time differential (dθb_y/dt) of θy_x, Ofst_y is the deviation of the overall gravitational center of the vehicle (the position of the mass Ga_y along the Y axis direction) from the position of the reference point Ps_y along the Y axis direction, ωz is the yaw rate (angular speed around the yaw axis) of the vehicle 1 during a cornering, and g is the gravitational acceleration.

ωb_x and θb_x are defined so as to be positive when the overall gravitational center of the vehicle tilts in the positive direction of the X axis (in the forward direction), and ωb_y and θb_y are likewise defined so as to be positive when the overall gravitational center of the vehicle tilts in the positive direction of the Y axis (in the leftward direction). ωz is defined so as to be positive when the vehicle turns in counterclockwise direction as seen from above.

The second term (h·ωb_x) in Equation 1a is the translational speed component along the X axis direction of the reference point Ps_x when the base frame 2 tilts around the Y axis. The second term (h·ωb_y) in Equation 2a is likewise the translational speed component along the Y axis direction of the reference point Ps_y when the base frame 2 tilts around the X axis.

Vw1_x in Equation 1a is the circumferential speed of the hypothetical wheel 61_x relative to the rod 62_x and hence the base frame 2. Therefore, Vw1_x includes the speed component (=r_x·ωb_x) owing to the tilting of the rod 62_x in addition to the traveling speed of the ground contact point of the hypothetical wheel 61_x in the X axis direction (traveling speed of the ground contact point of the motion unit 3 in the X axis direction). The same is true with Vw1_y in Equation 2a.

The first term of the right hand side of Equation 1b is the acceleration component in the X axis direction of the overall gravitational center Ga_x of the vehicle produced by the X axis component (F_x in FIG. 5) of the floor reaction (indicated by F in FIG. 5) at the ground contact point of the hypothetical wheel 61_x in dependence on the deviation (θb_x·(h−r_x)+Ofst_x) of the position of the overall gravitational center of the vehicle along the X axis (the position of the mass Ga_x along the X axis) from the vertical line passing through the ground contact point of the hypothetical wheel 61_x (the ground contact point of the first motion unit 3 as seen along the X axis). The second term of the right hand side of Equation 1b is the acceleration component in the X axis direction created by the centrifugal force acting on the vehicle when the vehicle is cornering with a yaw rate of ωz.

The first term of the right hand side of Equation 2b is the acceleration component in the Y axis direction of the overall gravitational center Ga_y of the vehicle produced by the Y axis component (F_y in FIG. 5) of the floor reaction (indicated by F in FIG. 5) at the ground contact point of the hypothetical wheel 61_y in dependence on the deviation (θb_y·(h−r_y)+Ofst_y) of the position of the overall gravitational center of the vehicle along the Y axis (the position of the mass Ga_y along the Y axis) from the vertical line passing through the ground contact point of the hypothetical wheel 61_y (the ground contact point of the first motion unit 3 as seen along the Y axis direction). The second term of the right hand side of Equation 2b is the acceleration component in the Y axis direction created by the centrifugal force acting on the vehicle when the vehicle is cornering with a yaw rate of ωz.

Figure 6:
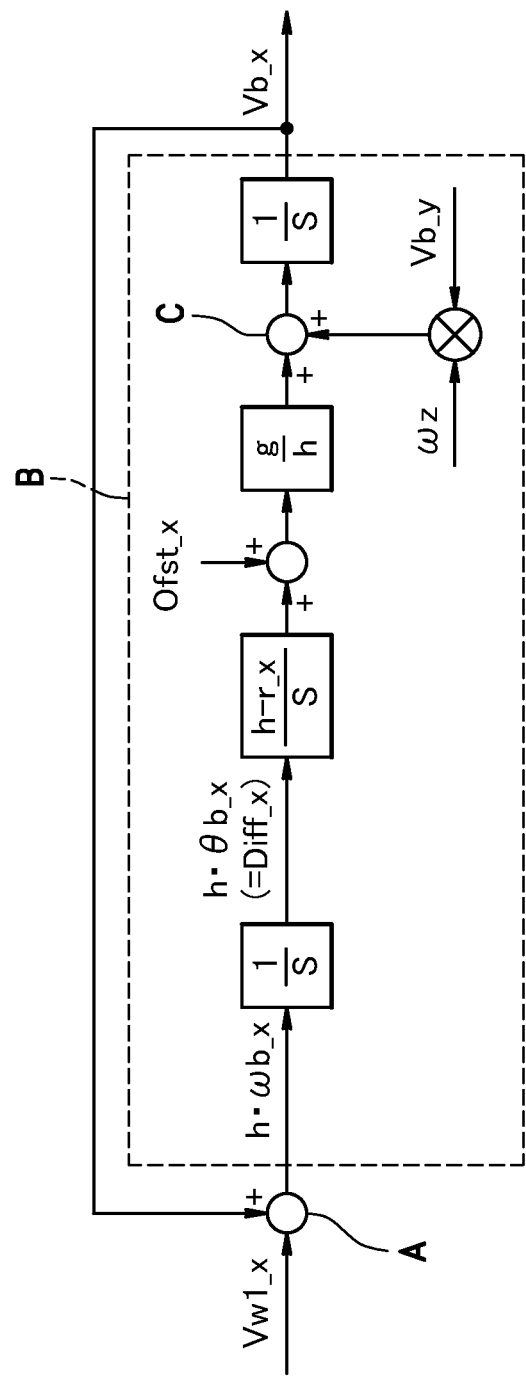
FIG. 6 is a block diagram showing the behavior of the inverted pendulum model shown in FIG. 5.

The behavior of the vehicle represented by Equations 1a and 1b (behavior as seen along the X axis) can also be represented by the block diagram shown in FIG. 6. "s" in this drawing denotes the Laplace variable.

The computation process indicated by letter A in FIG. 6 corresponds to FIG. 1a, and the computation process indicated by letter C in FIG. 6 corresponds to FIG. 1b.

h·θb_x in FIG. 6 is approximately equal to Diff_x shown in FIG. 5.

The block diagram representing the behavior (behavior along the Y axis) expressed by Equations 2a and 2b can be obtained by interchanging "_x" and "_y" in FIG. 6, and by changing the sign "+" of the acceleration component (acceleration component owing to the centrifugal force) given in a lower part of FIG. 6 (as one of the inputs to the adder denoted with letter C in FIG. 6) with the sign "−".

In the illustrated embodiment, the process algorithm of the first control process unit 24 is based on the deviation of the overall gravitational center of the vehicle from the reference point Ps_x, Ps_y and the behavior model of the overall gravitational center of the vehicle (inverted pendulum vehicle) which takes into account the centrifugal force as discussed above.

The process that is executed by the first control process unit 24 is more specifically discussed in the following. Please note that, in the following discussion, the variables concerning the behavior along the X axis and the variable concerning the behavior along the Y axis are commonly denoted with variables with a suffix "_xy".

With reference to FIG. 4, each computation process cycle of the control unit 24 is initiated by the execution of the process of a gravitational center speed estimation unit 31 in the first control process unit 24.

Based on the geometrical (the kinetic) relationship in the inverted pendulum vehicle represented by Equation 1a and 2a, the gravitational center speed estimation unit 31 computes an estimated value Vb_estm1_xy of the speed of the overall gravitational center of the vehicle.

More specifically, as shown by the block diagram of FIG. 4, the estimated value Vb_estm1_xy of the speed of the overall gravitational center of the vehicle is computed by subtracting the actual translational speed Vw1_act_xy from the product of the actual time differential (tilt angular speed) of the base frame 2 and the height h of the overall gravitational center of the vehicle.

In other words, the speed Vb_estm1_x of the overall gravitational center of the vehicle along the X axis, and the speed Vb_estm1_y of the overall gravitational center of the vehicle along the Y axis are computed by Equations 3a and 3b given below.

$$Vb\_estm1\_x = Vw1\_act\_x + h \cdot \omega b\_act\_x \tag{3a}$$

$$Vb\_estm1\_y = Vw1\_act\_y + h \cdot \omega b\_act\_y \tag{3b}$$

Here, it is assumed that the time differential of the deviation Ofs_xy (simply referred to as "deviation" in the following description) of the overall gravitation center of the vehicle from the reference point Ps_xy is negligible as it is sufficiently smaller than Vb_estm1_x.

In this computation, the target values Vw1_cmd_x and Vw1_cmd_y (previous values) of the translational speed of the first motion unit 3 determined by the attitude control computation unit 34 in the previous computation process cycle are used for the values of Vw1_act_x and Vw1_act_y, respectively.

Alternatively, the rotational speeds Nm_x and Nm_y of the electric motors 8a and 8b may be detected by the rotational speed sensors 72a and 72b to estimate the current values of Vw1_act_x and Vw1_act_y (or the measured current values of Vw1_act_x and Vw1_act_y) therefrom, and these estimated values may be used for the computation of Equations 3a and 3b.

In the illustrated embodiment, for the current values of ωb_act_x and ωb_act_y, the current values of the time differential of the measure value of the tilt angle θb of the base frame 2 based on the detection signals of the acceleration sensor 70 and the angular speed sensor 71 (or the measured current values of ωb_act_x and ωb_act_y) are used.

In the first control process unit 24, after the process of the gravitational center speed estimation unit 31 has been performed, the process of a gravitational center deviation estimation unit 32a of the gravitational center target speed computation unit 32 shown in FIG. 4 is performed. As a result, a gravitational center deviation estimated value Ofst_estm_xy which is the estimated value of a gravitational center deviation Ofst_xy of the overall gravitational center of the vehicle is determined.

Figure 7:
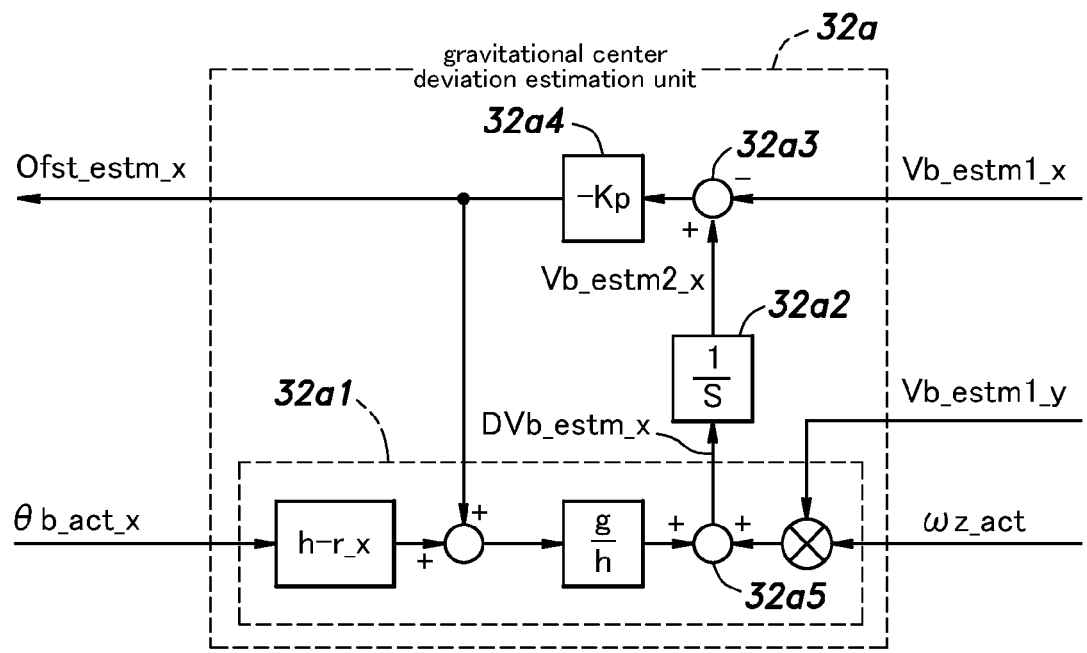
FIG. 7 is a block diagram showing the process carried out by the gravitational center deviation estimation unit shown in FIG. 4.

The process of the gravitational center deviation estimation unit 32a is represented by the block diagram shown in FIG. 7 in which the gravitational center deviation estimated value Ofst_estm_xy is represented by the gravitational center deviation estimated value Ofst_estm_x in the X axis direction.

In the process shown in FIG. 7, first of all, the gravitational center deviation estimation unit 32a computes the estimated value DVb_estm_x of the translational acceleration of the overall gravitational center of the vehicle in the X axis direction by computing the right hand side of Equation 1b with a computation unit 32a1 by using a measured value (current value) θb_act_x of the actual tilt angle of the base frame 2 around the Y axis obtained from the acceleration sensor 70 and the angular speed sensor 71, a measured value (current value) ωz_act of the actual yaw rate of the vehicle 1 obtained from the detection signal of the angular speed sensor 71, a first estimated value (current value) Vb_estm1_y of the speed of the overall gravitational center of the vehicle in the Y axis direction and an estimated value (previous value) Ofst_estm_x of the gravitational center deviation in the X axis direction determined in the previous computation cycle.

The gravitational center deviation estimation unit 32a then computes a second estimated value (current value) Vb_estm2_x of the speed of the overall gravitational center of the vehicle in the X axis direction by integrating the estimated value DVb_estm_x of the translational acceleration of the overall gravitational center of the vehicle in the X axis direction with a computation unit 32a2. The gravitational center deviation estimation unit 32a further computes a deviation between the second estimated value (current value) Vb_estm2_x of the speed of the overall gravitational center of the vehicle in the X axis direction and the first estimated value (current value) Vb_estm1_x of the speed of the overall gravitational center of the vehicle in the X axis direction with a computation unit 32a3. By multiplying a prescribed gain (−Kp) to this deviation with a computation unit 32a4, the current estimated value of the gravitational center deviation Ofst_estm_x in the X axis direction is determined.

The current estimated value of the gravitational center deviation Ofst_estm_y in the Y axis direction is determined in a similar fashion. More specifically, the block diagram for this determination process may be obtained by interchanging the suffices "_x" and "_y" and changing the sign of the acceleration component (caused by the centrifugal force) shown on the right hand side of the drawing as one of the inputs for the adder from "+" to "−".

By sequentially updating the estimated value of the gravitational center deviation Ofst_estm_xy with the gravitational center deviation estimation unit 32a, the value of Ofst_estm_xy may be caused to converge to the actual value thereof.

The first control process unit 24 computes a gravitational center deviation influence amount Vofs_xy by executing the process of a gravitational center deviation influence amount computing unit 32b in the gravitational center target speed computation unit 32 shown in FIG. 4.

The gravitational center deviation influence amount Vofs_xy represents the deviation of the actual gravitational center speed from the target speed of the overall gravitational center of the vehicle when a feedback control is performed without taking into account the fact that the position of the overall gravitational center of the vehicle deviates from the reference point Px_xy in the inverted pendulum model.

More specifically, the gravitational center deviation influence amount computing unit 32b computes the gravitational center deviation influence amount Vofs_xy by multiplying a value (Kth_xy/(h−r_xy))/Kvb_xy to each component of the estimated value of the gravitational center deviation Ofst_estm_xy that is newly determined.

Kth_xy is a gain value for determining the operating amount that is required to bring the tilt angle of the base frame 2 close to zero (target tilt command M_cmd_xy) in a process of the attitude control computation unit 34 which will be described hereinafter. Kvb_xy is the gain value for the operating amount that is required to minimize the deviation between a gravitational center target speed Vb_cmd_xy of the overall gravitational center of the vehicle and a first estimated value Vb_estm1_xy of the speed of the overall gravitational center of the vehicle in the attitude control computation unit 34 which will be described hereinafter. A gravitational center target speed computation unit 32c determines a gravitational center target speed Vb_cmd_xy corresponding to the deviation of the overall gravitational center of the vehicle.

The first control process unit 24 then computes the gravitational center target speed Vb_cmd_xy according to the gravitational center deviation influence amount Vofs_xy determined by the gravitational center deviation influence amount computing unit 32b by executing the process of the gravitational center target speed computation unit 32c of the gravitational center target speed computation unit 32 shown in FIG. 4. The gravitational center target speed computation unit 32c determines the gravitational center target speed Vb_cmd_xy that corresponds to the deviation of the overall gravitational center of the vehicle by executing a dead zone process regarding the value of the gravitational center deviation influence amount Vofs_xy.

More specifically, in the illustrated embodiment, when the value of the gravitational center deviation influence amount Vofs_x is within a dead zone A defined around zero as a narrow region along the X axis, the gravitational center target speed computation unit 32 sets the gravitational center target speed Vb_cmd_x in the X axis direction as zero. When the value of the gravitational center deviation influence amount Vofs_x is within an intermediate region B defined around the dead zone A along the X axis, the gravitational center target speed computation unit 32 sets the gravitational center target speed Vb_cmd_x as a value having the same sign as the gravitational center deviation influence amount Vofs_x and increasing in proportion to the magnitude of the gravitational center deviation influence amount Vofs_x. However, when the value of the gravitational center deviation influence amount Vofs_x along the X axis direction is a saturation region C, the value of the gravitational center target speed Vb_cmd_x is limited between a prescribed upper limit (>0) and a lower limit (≤0) so that the value of the gravitational center target speed Vb_cmd_x along the X axis is set to a prescribed upper limit or lower limit depending on which side of the saturation region C the value falls in.

The gravitational center target speed Vb_cmd_y along the Y axis is determined in a similar fashion.

In order to limit the rotational speed Nm_x, Nm_y of each electric motor 8a, 8b belonging to the first drive unit 8 of the first motion unit 3 within a prescribed tolerance range, the gravitational center target speed computation unit 32 may be provided with a limit process unit not shown in the drawings so that a limit may be imposed on the gravitational center target speed Vb_cmd_xy (combination of Vb_cmd_x and Vb_cmd_y).

In the limit process, if the gravitational center target speed Vb_cmd_xy (combination of Vb_cmd_x and Vb_cmd_y) is within a prescribed region (an octagonal region, for instance) in a coordinate system where the value of the gravitational center target speed Vb_cmd_x is taken on the vertical axis and the value of the target speed V1_y is taken along the horizontal axis, the gravitational center target speed Vb_cmd_xy is determined as the gravitational center target speed Vb_cmd_xy as it is. On the other hand, if the combination of the gravitational center target speed Vb_cmd_x and Vb_cmd_y is not within this prescribed region, the value of the gravitational center target speed Vb_cmd_xy is limited to that on the boundary of this prescribed region.

Because the gravitational center target speed Vb_cmd_xy is determined from the gravitational center deviation influence amount Vofs_x (or gravitational center offset), the vehicle operator can control the vehicle 1 by changing the attitude of the upper body of the vehicle operator (or by shifting the weight of the vehicle operator).

After the process of the gravitational center target speed computation unit 32 is executed, the first control process unit 24 determines the first target speed Vw1_cmd_xy which is the target value of the traveling speed (translational speed) of the first motion unit 3 by executing the process shown in the block diagram of FIG. 4.

More specifically, the first control process unit 24 determines the gravitational center deviation compensated gravitational center target speed Vb_cmpn_cmd_xy (current value) by executing the process of subtracting each component of the gravitational center deviation influence amount Vofs_xy from the corresponding component of the gravitational center target speed Vb_cmd_xy at a computation unit 34a.

The gravitational center deviation compensated gravitational center target speed Vb_cmpn_cmd_xy is determined as exemplified by the table shown in FIG. 8, for instance. More specifically, when the value of the gravitational center deviation influence amount Vofs_xy is a relatively small value located within the dead band region A shown in the graph in the gravitational center target speed computation unit 32c, and this value is supplied to the gravitational center target speed computation unit 32c, the value of the gravitational center target speed Vb_cmd_xy is set to zero while the gravitational center deviation compensated gravitational center target speed Vb_cmpn_cmd_xy (corresponding to the tilt angle of the base frame 2) is given with a value of a same magnitude as the gravitational center deviation influence amount Vofs_xy but is opposite in sign thereto. As a result, when the vehicle operator has moved the upper body of the vehicle operator forward by a small amount, the base frame 2 is caused to tilt backward, and the vehicle system as a whole is maintained at the neutral state.

When the value of the gravitational center deviation influence amount Vofs_x is an intermediate value located within the intermediate region B shown in the graph in the gravitational center target speed computation unit 32c, and this value is supplied to the gravitational center target speed computation unit 32c, the value of the gravitational center deviation compensated gravitational center target speed Vb_cmpn_cmd_x is set as a certain fixed value which is opposite in sign to the gravitational center deviation influence amount Vofs_x. Therefore, when the vehicle operator leans forward while seated on the vehicle 1, the vehicle 1 travels forward at a speed corresponding to the degree of leaning of the vehicle operator while the base frame 2 is maintained at a slightly rearwardly tilted attitude. In this case, for the gravitational center deviation compensated gravitational center target speed Vb_cmpn_cmd_x to favorably correspond to the movement of the vehicle operator, the increase rate of the gravitational center target speed Vb_cmd_xy with respect to a given increase of the gravitational center deviation influence amount Vofs_x in the intermediate region B should be 1. In other words, in the intermediate region B, the inclination of the curve in the graph in the gravitational center target speed computation unit 32c is preferred to be one.

When the value of the gravitational center deviation influence amount Vofs_x has reached a value located within the saturation region C shown in the graph in the gravitational center target speed computation unit 32c, and this value is supplied to the gravitational center target speed computation unit 32c, because the gravitational center target speed Vb_cmd_xy is limited to a certain limit value, the value of the gravitational center deviation compensated gravitational center target speed Vb_cmpn_cmd_x is opposite in sign to the gravitational center deviation influence amount Vofs_x, and increases with an increase in the gravitational center deviation influence amount Vofs_x. Therefore, when the vehicle is traveling forward, the rearward tilt angle of the base frame 2 increases with an increase in the value of the gravitational center deviation influence amount Vofs_x, and the vehicle operator is discouraged from leaning forward with an intension to accelerate.

The computation unit 34 then computes the target translational acceleration $DVw1\_cmd\_x$ along the X axis direction and the target translational acceleration $DVw1\_cmd\_y$ along the Y axis direction as two different components of the target translational acceleration $DVw1\_cmd\_xy$ given as a target value of the translational acceleration of the ground contact point of the first motion unit 3 by using the following equations. The computation unit 34 further includes a gravitational center target speed zero function unit 34b and an integrator 34c which will be described hereinafter.

$$DVw1\_cmd\_x = Kvb\_x \cdot (Vb\_cmpn\_cmd\_x - Vb\_estm1\_x) - Kth\_x \cdot \theta b\_act\_x - Kw\_x \cdot \omega b\_act\_x \quad (4a)$$

$$DVw1\_cmd\_y = Kvb\_y \cdot (Vb\_cmpn\_cmd\_y - Vb\_estm1\_y) - Kth\_y \cdot \theta b\_act\_y - Kw\_x \cdot \omega b\_act\_y \quad (4b)$$

where Kvb_xy, Kth_xy and Kw_xy in Equations 4a and 4b are predetermined gain values.

On the right hand side of Equation 4a, the first term is a feedback operation amount component depending on the deviation between the gravitational center deviation compensated gravitational center target speed Vb_cmpn_cmd_x (current value) of the overall gravitational center of the vehicle and the first estimated value Vb_estm1_x along the X axis, the second term is a feedback operation amount component depending on the actually measured tilt angle θb_act_x (current value) of the base frame 2 around the Y axis, and the third term is a feedback operation amount depending on the actually measured tilt angular speed ωb_act_x (current value) of the base frame 2 around the Y axis. The target translational acceleration DVw1_cmd_x along the X axis is obtained as a combination of these feedback operation amounts.

The actually measured tilt angle θb_act_x (current value) of the base frame 2 around the Y axis that is use in the second term of the right hand side of Equation 4a may take into account a correction angle that corrects the deviation between the designed gravitational center of the vehicle and the actual gravitational center. The actually measured tilt angle θb_act_y (current value) of the base frame 2 around the X axis that is use in the second term of the right hand side of Equation 4b may take into account a correction angle that corrects the deviation between the designed gravitational center of the vehicle and the actual gravitational center and an additional correction angle that is required to compensate for the tendency of the trajectory of the vehicle 1 during cornering to shift outward by tilting the base frame 2 inward to counteract the centrifugal force. In the block diagram of FIG. 4, the correction signal MO_xy that is supplied from the right hand side of the drawings to be subtracted from the actually measured tilt angle θb_act_xy of the base frame 2 corresponds to this correction angle. As will be discussed hereinafter, by summing the correction signal MO_xy and the tilt command M_xy for notification, the target tilt command M_cmd_xy is generated, and the tilt angle θb_act_xy is corrected by subtracting the target tilt command M_cmd_xy from the tilt angle θb_act_xy.

On the right hand side of Equation 4b, the first term is a feedback operation amount component depending on the deviation between the gravitational center deviation compensated gravitational center target speed Vb_cmpn_cmd_y (current value) of the overall gravitational center of the vehicle along the Y axis and the first estimated value Vb_estm1_y (current value), the second term is a feedback operation amount component depending on the actually measured tilt angle θb_act_y (current value) of the base frame 2 around the X axis, and the third term is a feedback operation amount depending on the actually measured tilt angular speed ωb_act_y (current value) of the base frame 2 around the X axis. The target translational acceleration DVw1_cmd_y along the Y axis is obtained as a combination of these feedback operation amounts.

In the attitude control computation unit 34, the first target translational speed Vw1_cmd_xy (current value) for the first motion unit 3 is determined by integrating the target translational acceleration DVw1_cmd_xy with the integrator 34c.

According to the first target translational speed Vw1_cmd_xy determined as discussed above, the first control process unit 24 controls the electric motors 8a and 8b serving as the first drive unit 8 for the first motion unit 3. More specifically, the first control process unit 24 determines the electric current command values for the electric motors 8a and 8b with a feedback control process such that the actual rotational speeds Nm_xy (measured value) may follow the target value of the rotational speed of the electric motor 8a, 8b as determined from the first target translational speed Vw1_cmd_xy, and supplies electric power corresponding to this electric current command value to the electric motor 8a, 8b.

Owing to the foregoing process, when the gravitational center target speed Vb_cmd_xy is a fixed value, and the vehicle 1 is traveling straight at a constant speed under a steady state condition, the overall gravitational center is located exactly above the ground contact point of the first motion unit 3 of the vehicle 1. Under this condition, the actual tilt angle θb_act_xy of the base frame 2 is equal to −Vofs_xy/(h−r_xy) according to Equations 1b and 2b or an angle that is required to remove the offset of the gravitational center. The actual tilt angular speed ωb_act_xy is zero, and the target translational acceleration DVw1_cmd_xy is zero. Based on this result and the block diagram of FIG. 4, it can be established that Vb_estm1_xy is equal to Vb_cmd_x.

In other words, the first target speed Vw1_cmd_xy of the first motion unit 3 is essentially determined such that the deviation between the target gravitational center translational speed DVw1_cmd_xy and the first estimated value Vb_estm1_xy converges to zero.

The process executed by the target tilt command computation unit 35 is described in the following.

In order to avoid the situation where the offset or the deviation of the overall gravitational center of the vehicle has become excessive for a given propelling capacity of the vehicle 1 by the electric motors 8a and 8b owing to the excessive leaning of the vehicle operator seated on the vehicle 1, the target tilt command computation unit 35 includes a notification function unit 35a for computing a tilt command M_xy to be superimposed on the target tilt command M_cmd_xy, and a computation unit 35b for executing a process for adding a tilt command M_xy for notification computed by the notification function unit 35a to the correction signal MO_xy.

A computation unit 34d subtracts the target tilt command M_cmd_xy (=M_xy+MO_xy) computed by the summing process at the computation unit 35b from the measured value of the actual tilt angle θb_act_xy of the base frame 2 with the result that the tilt angle θb_act_xy of the base frame 2 that is used in Equations 4a and 4b is corrected, Equations 4a and 4b allowing the target translational acceleration DVw1_cmd_xy which is the target value of the translational acceleration of the ground contact point of the first motion unit 3 to be computed. The corrected tilt angle θb_act_xy of the base frame 2 is multiplied by a gain value Kth_xy for determining the operation amount component for bringing the tilt angle of the base frame to zero (target tilt command M_cmd_xy), and the tilt command for notification M_xy and the correction signal MO_xy are superimposed on the target translational acceleration DVw1_cmd_xy for use as a feedback control amount corresponding to the tilt angle θb_act_xy of the base frame 2.

The notification function unit 35a is described in the following with a greater detail. The notification function unit 35a includes a first notification function unit 35a1 for computing a tilt vibration command M1_xy for notification to provide a notification by vibrating (or applying an a oscillatory tilt angle to) the base frame 2, a second notification function unit 35a2 for computing a tilt angle command M2_xy for notification to provide a notification by tilting the base frame 2 by a relatively large angle just once and a computation unit 35a3 for computing a tilt command M_xy for notification based on both the tilt vibration command M1_xy for notification and the tilt angle command M2_xy for notification.

More specifically, as shown in the block diagram of FIG. 4, the notification function unit 35a receives various input signals such as the estimated value Vb_estm1_xy of the traveling speed of the overall gravitational center of the vehicle 1 computed by the gravitational center speed estimation unit 31, the actual tilt angle θb_act_xy of the base frame 2 obtained from the detection signals of the acceleration sensor 70 and the angular speed sensor 71, the actual yaw rate ωb_act_xy of the vehicle 1 obtained from the detection signal of the angular speed sensor 71 and the rotational speeds Nm_xy of the electric motors 8a and 8b.

Figure 9:
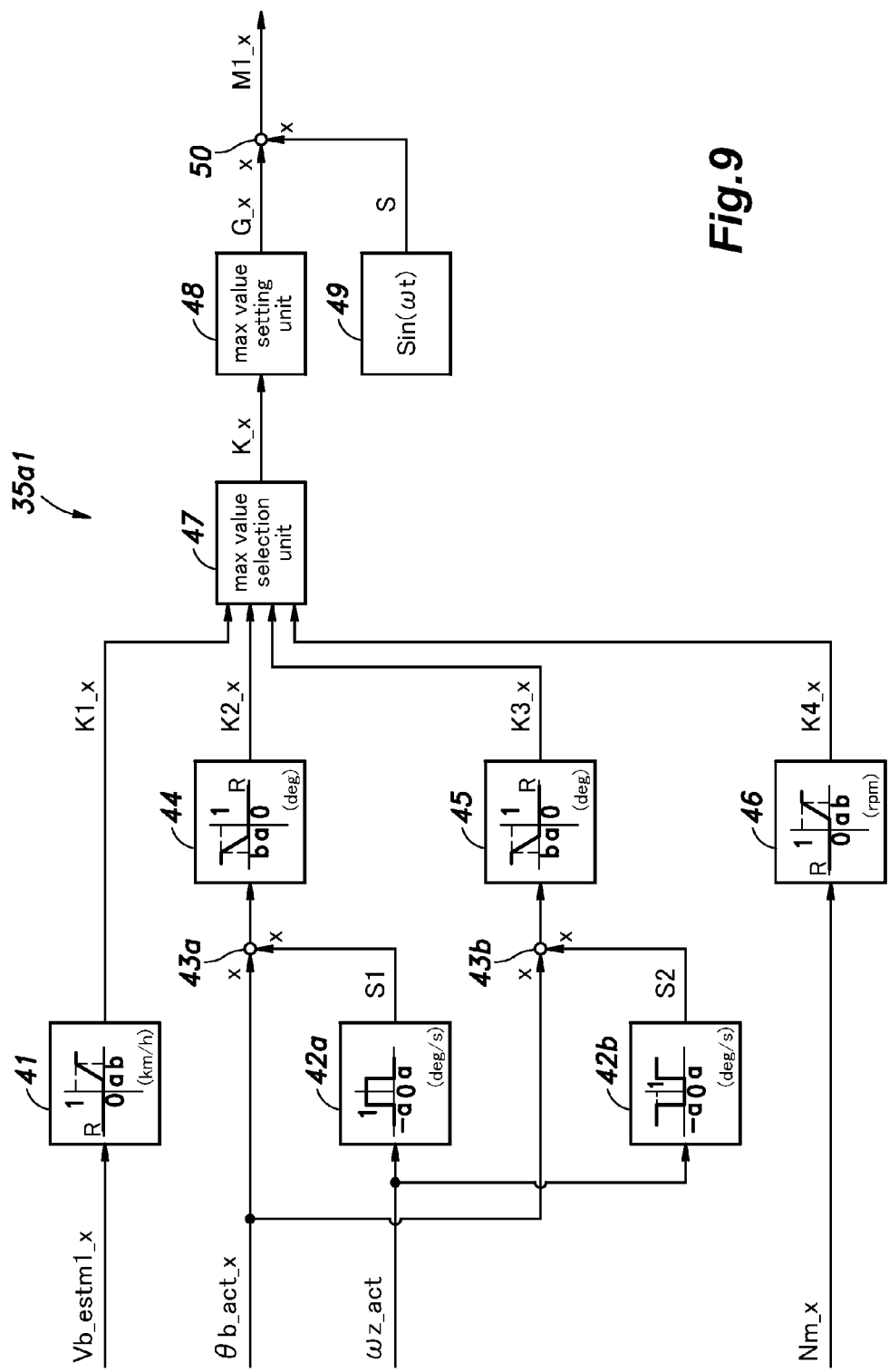
FIG. 9 is a block diagram showing the process carried out by the first notification function unit shown in FIG. 4.

The process performed by the first notification function unit 35a1 is shown in FIG. 9 in which the process of setting the tilt vibration command M1_x along the X axis represents the overall tilt vibration command M1_xy.

The first notification function unit 35a1 includes a first vibration coefficient setting unit 41 that performs the process of setting a first vibration coefficient K1_x according to the estimated value Vb_estm1_x of the speed of the overall gravitational center of the vehicle 1. The first vibration coefficient setting unit 41 sets the first vibration coefficient K1_x to zero when the value Vb_estm1_x is equal to or smaller than a prescribed value a, and sets the first vibration coefficient K1_x to one when the value Vb_estm1_x is equal to or greater than a prescribed value b which is greater than a. When the value Vb_estm1_x is greater than the prescribed value a and smaller than the prescribed value b, the first vibration coefficient K1_x is set to a value between 0 and 1 such that the value increases progressively with an increase in the value Vb_estm1_x.

In the illustrated embodiment, the value a and the value b that are used for the determination process by the first vibration coefficient setting unit 41 are selected as 6 km/h and 9 km/h, respectively. These values are selected to be smaller than the limit values beyond which the vehicle 1 may encounter some difficulty in maintaining the upright control. The region in which the estimated value Vb_estm1_x of the speed of the overall gravitational center of the vehicle is equal to or smaller than 6 km/h is defined as the upright control tolerance range R in which the upright control can be performed without any problem. In the process performed by the first vibration coefficient setting unit 41, the first vibration coefficient K1_x increases (linearly as shown in the graph in FIG. 9) in proportion to the increase in the difference between the value a and the value of K1_x or in proportion to the deviation of the value Vb_estm1_x from the upright control tolerance range R when the value Vb_estm1_x is greater than the prescribed value a and smaller than the prescribed value b.

The first notification function unit 35a1 performs a process for generating a non-cornering signal S1 indicating that the vehicle 1 is not cornering with a first cornering state determination unit 42a according to the actual yaw rate ωz_act of the vehicle 1, and a process for generating a cornering signal S2 indicating that the vehicle 1 is cornering with a second cornering state determination unit 42b according to the actual yaw rate ωz_act of the vehicle 1.

More specifically, the first cornering state determination unit 42a sets the non-cornering signal S1 indicating that the vehicle 1 is not cornering to 1 when the absolute value of θz_act is equal to or smaller than a prescribed value a, and sets the non-cornering signal S1 to zero when the absolute value of θz_act is greater than the prescribed value a. Similarly, the second cornering state determination unit 42b sets the cornering signal S2 indicating that the vehicle 1 is cornering to 1 when the absolute value of θz_act is equal to or greater than a prescribed value a, and sets the cornering signal S2 to zero when the absolute value of θz_act is smaller than the prescribed value a. The value a used in the first cornering state determination unit 42a may be equal to the value a used in the second cornering state determination unit 42b, and is 12 deg/sec in the illustrated embodiment.

In the first notification function unit 35a1, a first computation unit 43a performs the process of multiplying the actual tilt angle θb_act_x of the base frame 2 to the non-cornering signal S1, and a second computation unit 43b performs the process of multiplying the actual tilt angle θb_act_x of the base frame 2 to the cornering signal S2. Therefore, one of the values computed by the first computation unit 43a and the second computation unit 43b is zero, and the other is equal to the actual tilt angle θb_act_x of the base frame 2.

In the first notification function unit 35a1, a second vibration coefficient setting unit 44 performs the process of generating a second vibration coefficient K2_x according to the value (which is 0 or θb_act_x) computed by the first computation unit 43a, and a third vibration coefficient setting unit 45 performs the process of generating a third vibration coefficient K3_x according to the value (which is 0 or θb_act_x) computed by the second computation unit 43b.

More specifically, the second vibration coefficient setting unit 44 sets the value of K2_x to zero when the received value (which is 0 or θb_act_x) is equal to or smaller than a prescribed negative value a or when the rearward tilt angle of the base frame 2 is equal to or less than the absolute value of a, and sets the value of $K2\_x$ to 1 when the received value is equal to or smaller than a negative value b which is smaller than the value a or when the rearward tilt angle of the base frame 2 is equal to or greater than the absolute value of b. Furthermore, when the received value is smaller than the value a and greater than the value b, the second vibration coefficient setting unit 44 sets the value of $K2\_x$ to a value which increases in proportion to the increase in the absolute value of the received signal, and ranges between 0 and 1.

In the illustrated embodiment, the value a and the value b used for the determination process by the second vibration coefficient setting unit 44 are −9.7 degrees and −15.5 degrees, respectively. The absolute values of these values a and b are smaller than the absolute value of the stopper angle of the upper stopper 16 onto which the arm 15 abuts when the base frame 2 is tilted excessively so that the second vibration coefficient $K2\_x$ is set to 1 before the arm 15 abuts the upper stopper.

These values are selected to be greater (smaller in terms of absolute values) than the limit values beyond which the vehicle 1 may encounter some difficulty in maintaining the upright control. The region greater than −9.7 deg is defined as the upright control tolerance range R in which the upright control can be performed without any problem. In the process performed by the second vibration coefficient setting unit 44, the second vibration coefficient $K2\_x$ increases (linearly as shown in the graph in FIG. 9) in proportion to the increase in the difference between the value a and the received value or in proportion to the deviation of the received value from the upright control tolerance range R when the receive value is smaller than the prescribed value a and greater than the prescribed value b.

The third vibration coefficient setting unit 45 sets the value of the third vibration coefficient $K3\_x$ to zero when the received value (which is 0 or $\theta b\_act\_x$) is equal to or greater than a prescribed negative value a or when the rearward tilt angle of the base frame 2 is equal to or less than the absolute value of a, and sets the value of $K3\_x$ to 1 when the received value is equal to or smaller than a value b which is smaller than the value a (negative value) or when the rearward tilt angle of the base frame 2 is equal to or greater than the absolute value of b. Furthermore, when the received value is smaller than the value a and greater than the value b, the third vibration coefficient setting unit 45 sets the value of $K3\_x$ to a value which increases in proportion to the increase in the absolute value of the received signal, and ranges between 0 and 1.

The second vibration coefficient $K2\_x$ set by the second vibration coefficient setting unit 44 is a command value for notifying an excessive shifting of the gravitational center by the vehicle operator when the vehicle 1 is not cornering, and the third vibration coefficient $K3\_x$ set by the third vibration coefficient setting unit 45 is a command value for notifying an excessive shifting of the gravitational center by the vehicle operator when the vehicle 1 is cornering. When the vehicle 1 is cornering, the resulting centrifugal force tends to tilt the base frame 2 rearward so that the tilt command for notification or warning may be issued too readily if the same determination threshold value as when the vehicle 1 is not cornering is used. Therefore, in the illustrated embodiment, the values a and b used for the determination process by the third vibration coefficient setting unit 45 are equal to or smaller than the values a and b used by the second vibration coefficient setting unit 44 (the absolute values of a and b used by the third vibration coefficient setting unit 45 are equal to or greater than the absolute values of a and b used by the second vibration coefficient setting unit 44), and are set as −11.5 deg and −15.5 deg, respectively.

The value a and the value b that are used for the determination process by the third vibration coefficient setting unit 45 are selected to be greater (smaller in terms of absolute values) than the limit values beyond which the vehicle 1 may encounter some difficulty in maintaining the upright control. The region greater than −11.5 deg is defined as the upright control tolerance range R in which the upright control can be performed without any problem. In the process performed by the third vibration coefficient setting unit 45, the third vibration coefficient $K3\_x$ increases (linearly as shown in the graph in FIG. 9) in proportion to the increase in the difference between the value a and the received value or in proportion to the deviation of the received value from the upright control tolerance range R when the receive value is smaller than the prescribed value a and greater than the prescribed value b.

The first notification function unit 35a1 includes a fourth vibration coefficient setting unit 46 that performs the process of setting a fourth vibration coefficient $K4\_x$ according to the rotational speed $Nm\_x$ of the electric motor 8a. More specifically, the fourth vibration coefficient setting unit 4 sets the fourth vibration coefficient $K4\_x$ to zero when the value $Nm\_x$ is equal to or smaller than a prescribed value a, and sets the fourth vibration coefficient $K4\_x$ to one when the value $Nm\_x$ is equal to or greater than a prescribed value b which is greater than a. When the value $Nm\_x$ is greater than the prescribed value a and smaller than the prescribed value b, the fourth vibration coefficient $K4\_x$ is set to a value between 0 and 1 such that the value increases progressively with an increase in the value $Nm\_x$.

In the illustrated embodiment, the value a and the value b that are used for the determination process by the fourth vibration coefficient setting unit 46 are selected as 8,000 rpm and 10,000 rpm, respectively. These values are selected to be smaller than the limit values beyond which the vehicle 1 may encounter some difficulty in maintaining the upright control. The region in which the rotational speed $Nm\_x$ of the electric motor 8a is equal to or smaller than 8,000 rpm is defined as the upright control tolerance range R in which the upright control can be performed without any problem. In the process performed by the fourth vibration coefficient setting unit 46, the fourth vibration coefficient $K4\_x$ increases (linearly as shown in the graph in FIG. 9) in proportion to the increase in the difference between the value a and the value $Nm\_x$ or in proportion to the deviation of the value $Nm\_x$ from the upright control tolerance range R when the value $Nm\_x$ is greater than the prescribed value a and smaller than the prescribed value b.

Thereafter, in the first notification function unit 35a1, a maximum value selection unit 47 performs the process of generating a vibration coefficient $K\_x$ from the first to the fourth vibration coefficients $K1\_x$ to $K4\_x$. In particular, the maximum value selection unit 47 selects the largest of the values of the first to the fourth vibration coefficients $K1\_x$ to $K4\_x$, and set the selected valve as the vibration coefficient $K\_x$ ($0 \leq K\_x \leq 1$).

In the first notification function unit 35a1, an amplitude setting unit 48 performs the process of computing the amplitude $G\_x$ of the vibration for notification of the base frame 2 according to the vibration coefficient $K\_x$. More specifically, the amplitude setting unit 48 computes the amplitude $G\_x$ of the vibration for notification by multiplying the vibration coefficient $K\_x$ to a value set as the maximum amplitude of the vibration for notification (the maximum amplitude of the vibration angle of the base frame 2). In the illustrated embodiment, the maximum amplitude of the vibration for notification is set as 6 deg, and the product computed by the amplitude setting unit 48 is rounded up to the nearest integer value. Therefore, the amplitude G_x is at the minimum value of 1 deg when the vibration coefficient K_x is greater than 0, and the amplitude G_x is 6 deg when the vibration coefficient K_x is 1.

Alternatively, it can be configured such that when the vibration coefficient K_x is greater than 0, the computation process may be performed such that the value of 1 deg is assigned as the base value for the amplitude G_x, and the amplitude G_x of the vibration for notification is computed by adding to this base value the product of the vibration coefficient K_x and the value of 5 degrees obtained by subtracting the base value of 1 degree from the maximum value of the amplitude of the vibration for notification which is 6 degrees.

In the first notification function unit 35a1, a computation unit 50 sets a tilt vibration command M1_x for notification by the vibration of the base frame 2 along the X axis by performing the process of multiplying a sinusoidal wave S supplied by a sinusoidal wave generator 49 to the amplitude G_x computed by the amplitude setting unit 48. The sinusoidal wave generator 49 generates a sinusoidal wave of a prescribed frequency that can be represented by sin(ωt). Here, ω is frequency and t is time. In the illustrated embodiment, the frequency of the sinusoidal wave S is selected as 4 Hz (or ω=2π·4) which is known to cause discomfort to a human.

When the vibration coefficient K_x selected by the maximum value selection unit 47 is 1, the first notification function unit 35a1 generates the tilt vibration command M1_x for notification having an amplitude G_x of 6 deg (12 deg peak to peak) and a frequency of 4 Hz.

Figure 10:
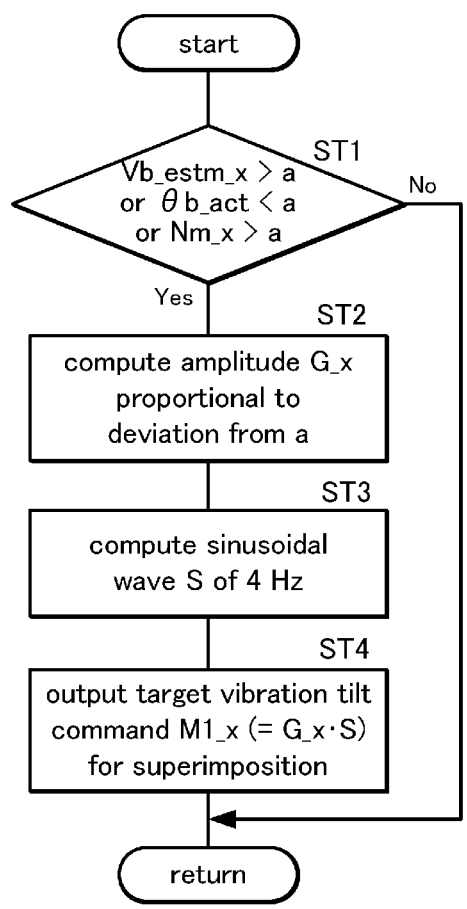
FIG. 10 is a flowchart showing the process carried out by the first notification function unit shown in FIG. 9.

The process performed by the first notification function unit 35a1 is represented by the flowchart shown in FIG. 10. The first notification function unit 35a1 performs the process represented by this flowchart at a prescribed control cycle. First of all, the first notification function unit 35a1 determines if the estimated value Vb_estm1_x of the speed of the overall gravitational center is greater than a prescribed value a, if the actual tilt angle θb_act_x of the base frame 2 is smaller than a prescribed negative value a, and if the rotational speed Nm_x of the electric motor 8a is greater than a prescribed value a (step ST1).

If all of the determination results are No in step ST1, the first notification function unit 35a1 concludes the routine shown in FIG. 10. When any one of the determination results is step ST1 is Yes, the amplitude setting unit 48 of the first notification function unit 35a1 computes the amplitude G_x which is proportional to the deviation of the corresponding determination variable (Vb_estm1_x, θb_act_x or Nm_x) from the corresponding determination threshold value a (step ST2). The sinusoidal wave generator 49 of the first notification function unit 35a1 then computes the sinusoidal wave S of 4 MHz (step ST3), and multiplies the amplitude G_x to the sinusoidal wave S to obtain the tilt vibration command M1_x that is to be superimposed on the target tilt command M_cmd_xy (step ST4). This concludes the routine shown in FIG. 10.

The discussion made above with reference to FIGS. 9 and 10 substantially equally applies to the process of setting the tilt vibration command M1_y for notification along the Y axis.

The second notification function unit 35a2 shown in FIG. 4 is described in the following. The process performed by the second notification function unit 35a2 is shown in FIG. 11 which represents the overall setting process for the notification tilt angle command M2_xy by the notification tilt angle command M2_x along the X axis.

Figure 11:
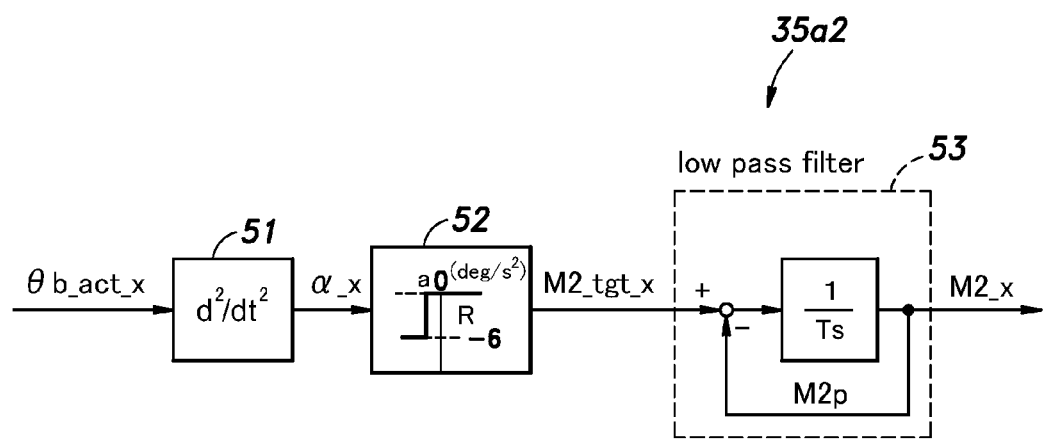
FIG. 11 is a block diagram showing the process carried out by the second notification function unit shown in FIG. 4.

The process shown in FIG. 11 is discussed in more detail in the following. A computation unit 51 of the second notification function unit 35a2 computes the tilt angular acceleration α_x of the base frame 2 by executing the process of twice differentiating the actual tilt angle θb_act_x of the base frame 2 with time. A notification angle command value setting unit 52 performs the process of setting a target notification tilt angle M2_tgt_x according to the tilt angular acceleration α_x of the base frame 2. In particular, when the value α_x is smaller (greater in terms of absolute values) than a prescribed negative value a, it is presumed that the base frame 2 has been subjected to a reaction caused by a rapid forward tilting movement of the vehicle operator so that the notification angle command value setting unit 52 sets the target notification tilt angle M2_tgt_x to a prescribed angle for notification in producing the notification tilt angle command M2_x. On the other hand, when the value α_x is greater than the prescribed negative value a, the notification angle command value setting unit 52 sets the target notification tilt angle M2_tgt_x to 0 deg.

The value a used by the second notification function unit 35a2 for the determination process is set as $-40$ deg/s$^2$, and the angle for notification is set as $-6$ deg in the illustrated embodiment. This value a is smaller than a threshold value beyond which the vehicle 1 may encounter some difficulty in maintaining the upright control, and the region in which the tilt angular acceleration α_x of the base frame 2 is equal to or greater than $-40$ deg/s$^2$ is set as the upright control tolerance range R in which the upright control can be maintained without any problem.

Then, in the second notification function unit 35a2, the target notification tilt angle M2_tgt_x is passed through a low pass filter 53 with a variable time constant T to produce the notification tilt angle command M2_x. In the illustrated embodiment, the target notification tilt angle M2_tgt_x is $-6$ deg, and the time constant T of the low pass filter 53 is set as 0.1 sec as a value that will allow a favorable notification to be performed by bringing the tilt angle θb_act_x of the base frame 2 to the notification angle with an appropriate promptness. The absolute value of the tilt angular acceleration α_x of the base frame 2 when the notification tilt angle command M2_x is given with this time constant T is greater than the absolute value of a so that the target notification tilt angle M2_tgt_x is continued to be supplied to the low pass filter 53 until the notification tilt angle command M2_x has reached the relatively large tilt angle of $-6$ deg.

When the actual tilt angle θb_act_x of the base frame 2 has reached the notification angle of $-6$ deg or when the actual tilt angle θb_act_x of the base frame 2 has reached the stopper angle of $-25$ deg (at which the arm 15 is engaged by the upper stopper 16), the target notification tilt angle M2_tgt_x computed by the notification angle command value setting unit 52 is 0 deg. When the target notification tilt angle M2_tgt_x is 0 deg, the second notification function unit 35a2 sets the time constant T of the low pass filter 53 to 0.05 sec so that the base frame 2 may be immediately restored to the initial tilt angle.

Figure 12:
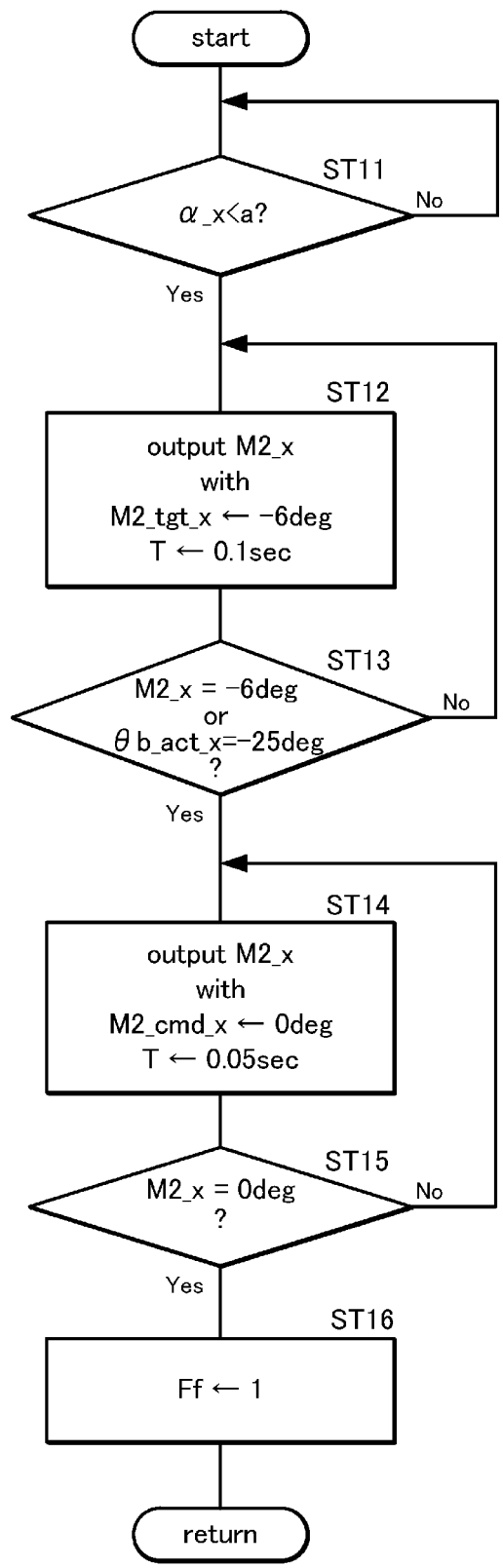
FIG. 12 is a flowchart showing the process carried out by the second notification function unit shown in FIG. 11.

The outline of the notification process by means of a notification angle performed by the second notification function unit 35a2 is shown in the flowchart of FIG. 12. Referring to FIG. 12, the second notification function unit 35a2 determines if the tilt angular acceleration α_x of the base frame 2 is smaller (larger in terms of absolute values when the values are negative) than a prescribed value a (step ST11). If the tilt angular acceleration α_x of the base frame 2 is equal to or greater than the prescribed value a (No in step ST11), the process of step ST11 is repeated until this determination result becomes Yes. When the tilt angular acceleration α_x of the base frame 2 is smaller than the prescribed value a, and the determination result of step ST11 is Yes, the second notification function unit 35a2 sets the value of the target notification tilt angle M2_tgt_x to −6 deg, and the time constant T of the low pass filter 53 to 0.1 sec, and starts the process of producing the notification tilt angle command M2_x (step ST12). Thereby, the base frame 2 starts tilting rearward.

Step ST13 is then executed. The determination process of step ST13 consists of determining if two prescribed conditions are met, the first condition being that the notification tilt angle command M2_x has reached value of −6 deg which is the value of the target notification tilt angle M2_tgt_x, and the second condition being that the actual tilt angle θb_act_x of the base frame 2 has reached the stopper angle of −25 deg. If neither of these conditions is met or the determination result of step ST13 is No, the second notification function unit 35a2 continues the process of step ST12 until at least one of the two conditions is met.

When the notification tilt angle command M2_x reaches −6 deg owing to the elapsing of a certain time period depending on the time constant T of the low pass filter 53 or when the actual tilt angle θb_act_x of the base frame 2 reaches the stopper angle of −25 deg owing to the issuance of the notification tilt angle command M2_x under the condition where the tilt angle θb_act_x of the base frame 2 is relatively large while the tilt angular acceleration α_x of the base frame 2 is smaller than the value a, at least one of the two conditions are met in the determination process of step ST13, and the determination result of step ST13 becomes Yes. At such a time, the second notification function unit 35a2 sets the target notification tilt angle M2_tgt_x to 0 deg, and sets the time constant T of the low pass filter 53 to 0.05 sec before starting the process of producing the notification tilt angle command M2_x (step ST14). As a result, the vehicle 1 starts the action of restoring the rearwardly tilted base frame 2 back to the original angle.

The determination result of step ST15 remains to be No as long as the result of the determination process performed in step ST15 indicates that the notification tilt angle command M2_x has not become 0 deg which is the value of the target notification tilt angle M2_tgt_x.

The determination result of step ST 12 becomes Yes when the target notification tilt angle M2_tgt_x has become 0 deg owing to the elapsing of a certain time period depending on the time constant T of the low pass filter 53. At such a time, the second notification function unit 35a2 sets a notification completion flag Ff associated with the notification tilt angle command M2_x to 1 (step ST16), and the program flow returns to the start.

The foregoing description with reference to FIGS. 11 and 12 applies substantially equally to the process of setting the notification tilt angle command M2_y along the Y axis.

The notification function unit 35a shown in FIG. 4 further includes a computation unit 35a3 which computes the notification tilt command M_xy that is to be ultimately superimposed on the target translational acceleration DVw1_cmd_xy by adding the tilt vibration command M1_xy computed by the first notification function unit 35a1 to the notification tilt angle command M2_xy computed by the second notification function unit 35a2.

The gravitational center target speed zero function unit 34b shown in FIG. 4 is described in the following. When the arm 15 is engaged by the upper stopper 16 owing to the rearward tilt of the base frame 2, it can be presumed that the notification by the notification tilt angle command M2_x was produced by the rapid leaning of the vehicle operator before this happens. In such a case, the state where the arm 15 is engaged by the upper stopper 16 can be most readily resolved by setting the gravitational center deviation compensated gravitational center target speed Vb_cmpn_cmd_x to zero to bring the tilt angle of the vehicle close to the upright angle. Under such a circumstance, the gravitational center target speed zero function unit 34b performs the function of temporarily changing the value of the gravitational center deviation compensated gravitational center target speed Vb_cmpn_cmd_x. In other words, the gravitational center target speed zero function unit 34b changes only the gravitational center deviation compensated gravitational center target speed Vb_cmpn_cmd_x along the X axis because the stopper 16 limits only the tilt angle around the Y axis.

Alternatively, if the tilt angle around the X axis is limited by a part of the base frame 2 such as the foot rests 9, the gravitational center target speed zero function unit 34b may be configured to change the gravitational center deviation compensated gravitational center target speed Vb_cmpn_cmd_y along the Y axis as well.

Figure 13:
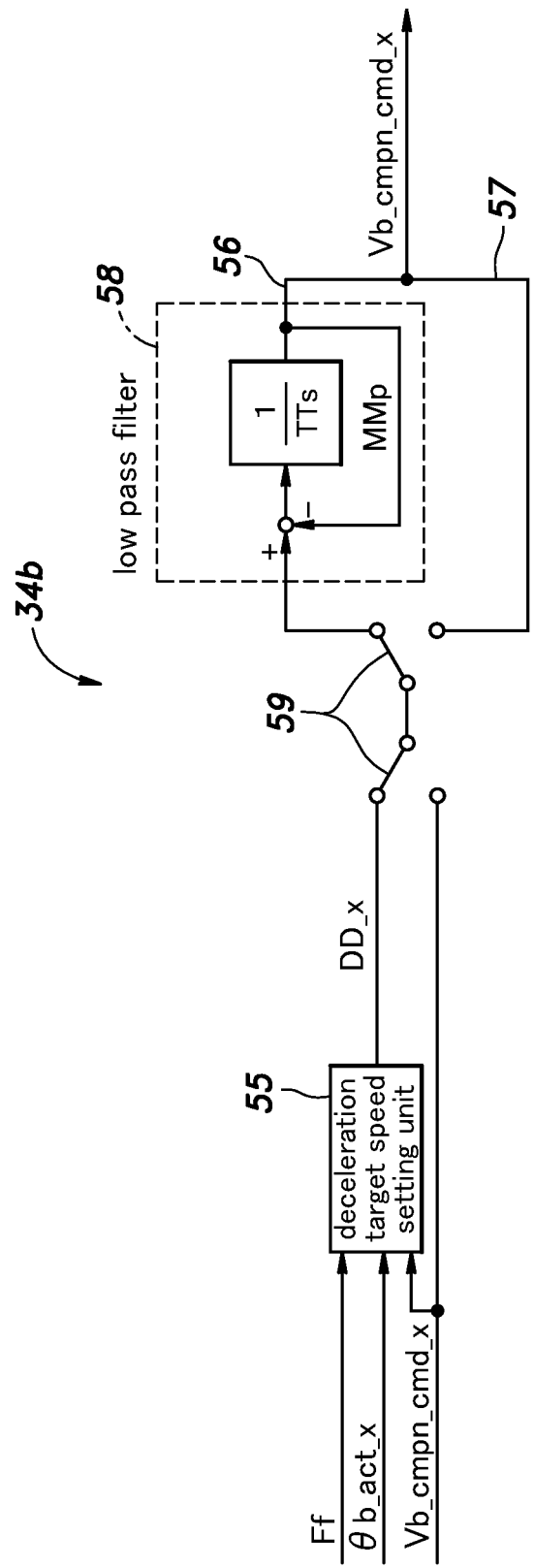
FIG. 13 is a block diagram showing the process carried out by the gravitational center target speed zero function unit shown in FIG. 4.

Referring to FIG. 13, the gravitational center target speed zero function unit 34b includes a deceleration target speed setting unit 55 for setting a deceleration target speed DD_x for temporarily changing the value of the gravitational center deviation compensated gravitational center target speed Vb_cmpn_cmd_x, a first line 56 and a second line 57 that are provided in parallel to each other, a low pass filter 58 provided on the first line 56 and a switching unit 59 for switching between the state where the deceleration target speed DD_x for temporarily changing the value of the gravitational center deviation compensated gravitational center target speed Vb_cmpn_cmd_x is supplied to the first line 56 and the state where the deceleration target speed DD_x is supplied to the second line 57.

Based on the measured value of the actual tilt angle θb_act_x of the base frame 2 around the Y axis obtained from the detection signals of the acceleration sensor 70 and the angular speed sensor 71, the gravitational center deviation compensated gravitational center target speed Vb_cmpn_cmd_y computed by the computation unit 34a (FIG. 4) and the notification complete flag Ff, the deceleration target speed setting unit 55 of the gravitational center target speed zero function unit 34b performs the process of setting the deceleration target speed DD_x. More specifically, the deceleration target speed setting unit 55 sets the deceleration target speed DD_x to zero when the tilt angle θb_act_x of the base frame 2 reaches the stopper angle of −25 deg, and sets the deceleration target speed DD_x to the value of the gravitational center deviation compensated gravitational center target speed Vb_cmpn_cmd_x when the notification complete flag Ff is 1.

In the gravitational center target speed zero function unit 34b, when the tilt angle θb_act_x of the base frame 2 reaches the value of −25 deg, the deceleration target speed DD_x is supplied to the first line 56, and the process of supplying the gravitational center deviation compensated gravitational center target speed Vb_cmpn_cmd_x to the second line 57 is performed by the switching unit 59 at a prescribed timing which will be discussed hereinafter. Under the normal condition where the switching unit 59 supplies the gravitational center deviation compensated gravitational center target speed Vb_cmpn_cmd_x to the second line 57, the gravitational center deviation compensated gravitational center target speed Vb_cmpn_cmd_x is produced from the gravitational center target speed zero function unit 34*b* as it is. Meanwhile, during the deceleration process in which the switching unit 59 supplies the deceleration target speed DD_x to the first line 56, the output value MM_x obtained by passing the deceleration target speed DD_x through the low pass filter 58 is obtained from the gravitational center target speed zero function unit 34*b* as the gravitational center deviation compensated gravitational center target speed Vb_cmpn_cmd_x.

The low pass filter 58 is provided with a variable time constant T. When the tilt angle θb_act_x of the base frame 2 reaches the value of −25 deg, the gravitational center target speed zero function unit 34*b* forwards the deceleration target speed DD_x to the first line 56. At the same time, the time constant T of the low pass filter 58 is set to a prescribed value (0.3 sec in the illustrated embodiment), and the output value MM_x of the low pass filter 58 is caused to approach the deceleration target speed DD_x which is the input value at a speed corresponding to this time constant T. Thereafter, once the notification complete flag Ff becomes 1, the gravitational center target speed zero function unit 34*b* sets the time constant T of the low pass filter 58 to a prescribed value (0.3 sec in the illustrated embodiment), and the output value MM_x of the low pass filter 58 is caused to approach the gravitational center deviation compensated gravitational center target speed Vb_cmpn_cmd_x, which is the input value, at a rate corresponding to this time constant T.

Upon elapsing of a prescribed time period (0.5 sec in the illustrated embodiment) from the time point when the notification complete flag Ff has become 1, the switching unit 59 of the gravitational center target speed zero function unit 34*b* performs the process of forwarding the gravitational center deviation compensated gravitational center target speed Vb_cmpn_cmd_x to the first line 56.

Figure 14:
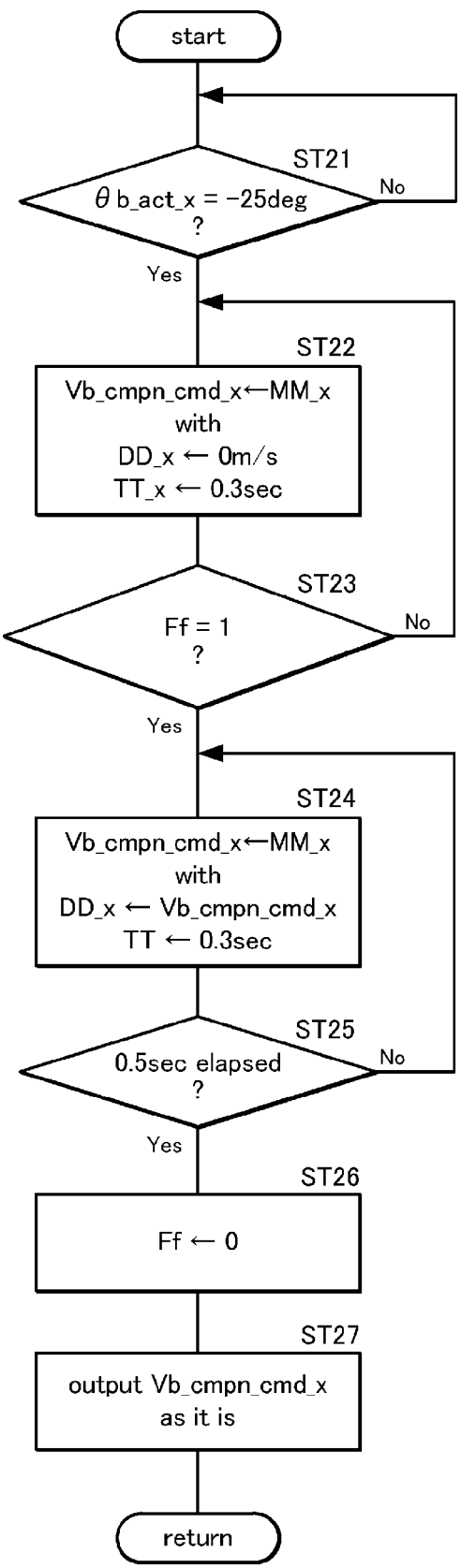
FIG. 14 is a flowchart showing the process carried out by the gravitational center target speed zero function unit shown in FIG. 13.

The outline of the process performed by the gravitational center target speed zero function unit 34*b* is represented by the flowchart of FIG. 14. Referring to this drawing, the gravitational center target speed zero function unit 34*b* determines if the tilt angle θb_act_x of the base frame 2 has reached the stopper angle of −25 deg (step ST21). If the tilt angle θb_act_x of the base frame 2 is greater than −25 deg (or on the positive side thereof) (No in step ST21), the process of step ST21 is repeated until the determination results changes to Yes. Once the tilt angle θb_act_x of the base frame 2 has reached −25 deg, and the determination result of step ST21 changes to Yes, the gravitational center target speed zero function unit 34*b* sets the deceleration target speed DD_x to 0 m/s, and sets the time constant T of the low pass filter 53 to 0.3 sec before starting the process of producing the output value MM_x of the low pass filter 58 as the gravitational center deviation compensated gravitational center target speed Vb_cmpn_cmd_x (step ST22). As a result, the vehicle 1 operates so as to restore the tilt angle of the base frame 2 back to zero.

It is then determined if the notification complete flag Ff has become 1 in step ST23. If the notification complete flag Ff is not 1 or the determination result of step ST23 is No, the gravitational center target speed zero function unit 34*b* repeats the process of step ST22.

When the notification complete flag Ff has become 1 owing to the conclusion of the notification process by means of the notification tilt angle as discussed earlier with reference to FIG. 12, and the determination result in step ST23 is hence yes, the gravitational center target speed zero function unit 34*b* sets the deceleration target speed DD_x to the value of the gravitational center deviation compensated gravitational center target speed Vb_cmpn_cmd_x, and sets the time constant T of the low pass filter 53 to 0.3 sec before performing the process of producing the output value MM_x of the low pass filter 58 as the gravitational center deviation compensated gravitational center target speed Vb_cmpn_cmd_x (step ST24). As a result, the vehicle starts the operation of bringing the base frame 2 from the upright condition to the original tilt angle determined by the gravitational center deviation compensated gravitational center target speed Vb_cmpn_cmd_x.

The determination result of step ST25 remains to be No as long as the result of the determination process performed in step ST25 indicates that a time period of 0.5 sec has not elapsed since the notification complete flag Ff became 1, and the gravitational center target speed zero function unit 34*b* continues the process of step ST24.

When the time period of 0.5 sec has elapsed since the notification complete flag Ff became 1, and the determination result of step ST25 changes to Yes as a result, the gravitational center target speed zero function unit 34*b* restores the value of the notification complete flag Ff to zero (step ST26), and starts the process of producing the gravitational center deviation compensated gravitational center target speed Vb_cmpn_cmd_x computed by the computation unit 34*a* (FIG. 4) as it is (step ST27), before the program flow returns to the start.

Thus, when the tilt angle of the base frame has reached the stopper angle of −25 deg (step ST21: Yes), the gravitational center target speed zero function unit 34*b* sets the deceleration target speed DD_x to 0 m/s. In other words, by setting the value of the gravitational center deviation compensated gravitational center target speed Vb_cmpn_cmd_x so as to bring the tilt angle of the base frame 2 to zero, the tilt angle of the base frame 2 is caused to be quickly restored to zero so that the vehicle 1 is allowed to be released from the state where the based frame 2 is tilted to the stopper angle.

When the gravitational center target speed zero function unit 34*b* has produced the output value MM_x of the low pass filter 58 as the gravitational center deviation compensated gravitational center target speed Vb_cmpn_cmd_x with the time constant T selected as 0.3 sec, and the notification completion flag Ff1 has changed to 1 to indicate the completion of the process of the tilt command for notification set by the second notification function unit 35*a*2 (ST23: Yes), the base frame 2 is allowed to move in a smooth manner by starting the process of producing the gravitational center deviation compensated gravitational center target speed Vb_cmpn_cmd_x as it is with the time constant T selected as 0.3 sec so as to restore the tilt angle of the base frame 2 to the original angle (ST24).

The process of the first control process unit 24 in the illustrated embodiment has been discussed.

In the following is discussed the effect of the process performed by the above discussed first control process unit 24.

FIGS. 15A and 15B are diagrams illustrating the effect of the process performed by the first notification function unit 35*a*1 shown in FIG. 4. FIG. 15A shows the property of an example for comparison which does not use the tilt vibration command M1_x, and FIG. 15B shows the property of an example according to the present invention which uses the tilt vibration command M1_x. In each of the drawings, the horizontal axis represents time, and the upper graph shows the changes in the traveling speed and the tilt angle of the base frame 2 while the lower graph shows the changes in the vibration tilt command M1_x.

The example shown in FIG. 15A does not use the tilt vibration command M1_x, and the value of M1_x is zero at all times. It can be seen that with an increase in the traveling speed of the base frame 2, the rearward tilting of the base frame 2 increases (the absolute value thereof increases) simply in a corresponding manner.

In the example shown in FIG. 15B, when the traveling speed of the base frame 2 has increased to a prescribed value a or 6 km/h in about two seconds, the vibration tilt command M1_x is set as a vibration wave of 4 Hz, and the amplitude of this vibration wave increases with an increase in the traveling speed. Even when the traveling speed of the base frame 2 has dropped below 6 km/h, the vibration tilt command M1_x is maintained because the tilt angle of the base frame 2 is still smaller (greater in terms of absolute values) than −9.7 deg which is selected as the prescribed value a. Once the tilt angle of the base frame 2 becomes equal to or greater than −9.7 deg or at the time point of 7.5 sec, the vibration tilt command M1_x is ceased.

When the vibration tilt command M1_x is used, the tilt angle of the base frame 2 shown in the upper part of the drawing changes in an oscillatory manner in response to the oscillatory change in the tilt vibration command M1_x. The base frame 2 therefore experiences a vibratory tilting. Because the amplitude of the vibration tilt command M1_x increases in proportion to the deviation of the estimated value Vb_estm1_xy of the speed of the overall gravitational center of the vehicle or the value θb_act_x of the actual tilt angle of the base frame 2 from the corresponding upright control tolerance range R, the vibratory changes of the tilt angle of the base frame 2 also increases in amplitude in proportion to the deviation. Therefore, before the vehicle 1 is brought into a state where some difficulty is encountered in maintaining the upright control, the vehicle operator is appropriately notified or warned by manes of relatively small angular changes of the base frame 2.

Because the amplitude of the vibration tilt command M1_x provides a notification by the vibratory change in the tilt angle of the base frame of an amplitude proportional to the deviation of any of the vehicle state variables from the corresponding upright control tolerance range R as a notification in the form of a change in the behavior of the vehicle 1, even when the vehicle operator may continue to accelerate the vehicle 1 without paying much attention, the increase in the amplitude of the tilt vibration of the base frame 2 ensures that the notification is properly conveyed to the vehicle operator. In particular, by using a sinusoidal wave for the tilt vibration command M1_x, the base frame 2 can be vibrated in a smooth manner, and by using a frequency such as 4 Hz which is known to cause discomfort to the human, the notification is conveyed to the vehicle operator without fail.

In the illustrated embodiment, the state information of the vehicle for setting the tilt vibration command M1_x that is to be superimposed on the target tilt command M_cmd_xy may include the estimated value Vb_estm1_ x of the speed of the overall gravitational center of the vehicle, the tilt angle θb_act_x of the base frame 2 and the rotational speed Nm_x of the electric motor 8a. When at least one of the three values deviates from the corresponding tolerance range R (when the traveling speed of the base frame 2 has reached 6 km/h in the example shown in FIGS. 16A-16B, and when the determination result of step ST1 has changed to Yes in the flowchart of FIG. 10), the attitude control computation unit 34 starts superimposing the tilt vibration command M1_x on the target tilt command M_cmd_x (in step ST2 in the flowchart of FIG. 10). Therefore, the vehicle operator is notified before the vehicle 1 is placed under a condition where some difficulty may be encountered in maintaining the upright control.

Once these three values are brought back to within the corresponding upright control tolerance ranges R (or when the tilt angle of the base frame 2 has become equal to or greater than −9.7 deg or when the determination result of step ST1 in the flowchart of FIG. 10 has changed to No), the attitude control computation unit 34 ceases superimposing the tilt vibration command M1_x on the target tilt command M_cmd_x. Therefore, the situation where the upright control may not be properly maintained can be avoided in a reliable manner.

FIGS. 16A and 16B are diagrams illustrating the effect of the process performed by the first notification function unit 35a1 and the second notification function unit 35a2 shown in FIG. 4. FIG. 16A shows the property of an example for comparison which does not use the tilt vibration command M1_x or the notification tilt angle command M2_x, and FIG. 16B shows the property of an example according to the present invention which uses the tilt vibration command M1_x and the notification tilt angle command M2_x. In each of the drawings, the horizontal axis represents time, and the upper graph shows the changes in the traveling speed and the tilt angle of the base frame 2 while the lower graph shows the changes in the vibration tilt command M1_x and the notification tilt angle command M2_x.

The example shown in FIG. 16A does not use the tilt vibration command M1_x or the notification tilt angle command M2_x, and both of them are zero deg at all times. It can be seen that with an increase in the traveling speed of the base frame 2, the rearward tilting of the base frame 2 increases (the absolute value thereof increases) simply in a corresponding manner.

In the example shown in FIG. 16B, when the traveling speed of the base frame 2 has increased to a prescribed value a or 6 km/h in about six seconds, the vibration tilt command M1_x is set as a vibration wave of 4 Hz, and the amplitude of this vibration wave increases with an increase in the traveling speed. When the tilt angular acceleration α_x of the base frame 2 has increased beyond −40 deg/s$^2$ in about 7 seconds, the notification tilt angle command M2_x is set to −6 deg. Once the notification tilt angle command M2_x has reached the notification angle (−4 deg in the illustrated embodiment), the notification tilt angle command M2_x is decreased in absolute value toward zero.

Even after the notification tilt angle command M2_x has reached the notification angle, the tilt angle of the base frame 2 does not reach the stopper angle of −25 deg, and the gravitational center target speed zero function unit 34b does not function, but the vehicle operator is already notified, and is expected to have reduced the traveling speed of the base frame 2. The vibration tilt command M1_x is eliminated upon elapsing of 11 seconds when the tilt angle of the base frame has become greater than −9.7 deg.

When the notification tilt angle command M2_x is set, the base frame 2 is tilted rearward so as to apply a moment that opposes the input by the vehicle operator as shown in the upper graph. Therefore, the vehicle operator is properly notified before the vehicle 1 is placed under a condition where some difficulty may be encountered in maintaining the upright control.

In the illustrated embodiment, the state information of the vehicle 1 for setting the notification tilt angle command M2_x that is to be superimposed on the target tilt command M_cmd_x includes the tilt angular acceleration of the base frame 2. When the tilt angular acceleration α_x of the base frame 2 has deviated from the corresponding upright control tolerance range R (or at the time point of 7 sec when the value α_x exceeded −40 deg/s$^2$ or when the determination result of ST11 in the flowchart of FIG. 12 changed to Yes), the attitude control computation unit 34 sets the notification tilt angle command M2_x such that the time constant is 0.1 sec, and the notification tilt angle of the base frame 2 is −6 deg (−4 deg in FIG. 16B) (step ST12 in the flow chart of FIG. 12). When the notification tilt angle command M2_x has reached the notification tilt angle of −6 deg (when the determination result of step ST13 in FIG. 12 has changed to Yes), the attitude control computation unit 34 sets the notification tilt angle command M2_x such that the time constant is set to 0.05 sec, and the base frame 2 is restored to the original angle (step ST14 of FIG. 12). As a result, the base frame 2 is tilted by a relatively large angle in a short time as a single shot with an appropriate speed which does not excessively alarm the vehicle operator so that the vehicle operator may be notified in a both safe and reliable manner.

Figure 17:
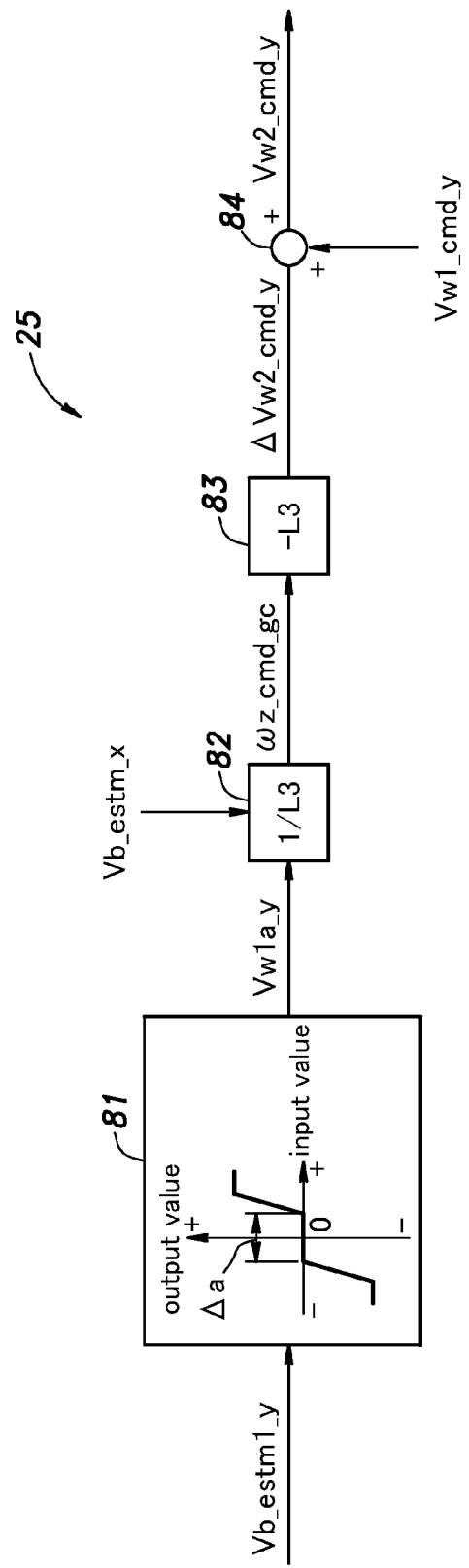
FIG. 17 is a block diagram showing the process performed by the second control process unit shown in FIG. 3.

The process of the second control process unit 25 shown in FIG. 3 is described in the following with reference to FIG. 17. The second control process unit 25 is configured to determine the presence of a command to corner the vehicle 1 (cornering command) or a how strong the particular cornering command is according to the actual motion or the target of the motion of a representative point of the vehicle 1 such as the overall gravitational center of the vehicle 1 or the motion unit 3 in the Y axis direction (or the lateral direction), or the behavior of the vehicle operator regarding the state of the motion of the vehicle.

In the illustrated embodiment, the estimated value Vb_estm1_y of the traveling speed of the overall gravitational center of the vehicle in the Y axis direction computed by the gravitational center speed estimation unit 31 is used as an index for determining the presence or the strength of the cornering command. The value Vb_estm1_y coincides with the traveling speed of the reference point Ps_y in the Y axis direction, and may be considered as an observed value of the traveling speed of a representative point fixed on the base frame 2 in the Y axis direction.

When a cornering command is detected, the second control process unit 25 determines the second target speed Vw2_cmd_y of the second motion unit 4 in the Y axis direction to a value different from the first target speed Vw1_cmd_y of the first motion unit 3 in the Y axis direction in order to cause a cornering movement of the vehicle 1.

The process of the second control process unit 25 is described in the following with greater detail. Referring to FIG. 17, a process unit 81 of the second control process unit 25 receives the estimated value Vb_estm1_y (current value) of the traveling speed of the overall gravitational center of the vehicle in the Y axis direction computed by the gravitational center speed estimation unit 31, and determines a dead zone processed speed Vw1a_y according to the received estimated value Vb_estm1_y.

When the vehicle operator intends to turn the vehicle 1 either in the leftward or rightward direction, the vehicle operator shifts his or her weight in the corresponding direction by leaning the upper body of the vehicle operator in the corresponding direction. In such a case, the first target speed Vw1_cmd_y of the first motion unit 3 in the lateral direction determined by the control process of the first control process unit 24 corresponds to the rightward or leftward traveling speed.

However, even if the vehicle operator does not intend to turn the vehicle 1, an inadvertent movement of the upper body of the vehicle operator may cause the weight of the vehicle operator to be shifted in the leftward or rightward direction. Therefore, the process unit 81 determines the dead zone processed speed Vw1a_y according to the property of the graph given in FIG. 17 which depends on the estimated value Vb_estm1_y. More specifically, when the absolute value of Vb_estm1_y is relatively small, and within a prescribed range Δa around zero (when the absolute value of Vb_estm1_y is equal to or less than a prescribed value), the process unit 81 determines that there is no cornering command, and sets Vw1a_y to zero.

On the other hand, when the absolute value of Vb_estm1_y is relatively large, and outside a prescribed range Δa around zero (when the absolute value of Vb_estm1_y is greater than the prescribed value), the process unit 81 determines that there is a cornering command, and sets Vw1a_y to a certain non-zero value.

In particular, the process unit 81 determines Vw1a_y such that Vw1a_y increases in proportion to an increase in Vb_estm1_y once this dead zone is exceeded, and is limited by a certain saturation value. The signs of Vw1a_y and Vb_estm1_y are the same over the entire range. As will be discussed hereinafter, in order to place the center of cornering movement at a desirable point, the increase rate of Vw1a_y with respect to Vb_estm1_y should be 1. In other words, the graph shown in FIG. 7 should demonstrate an inclination of 1 in the regions excluding the dead band region and the saturation regions.

Thereafter, a process is executed by a process unit 82 in the second control process unit 25. The process unit 82 determines a target cornering angular speed ωz_cmd_gc which is the target value of the cornering angular speed (angular speed around the yaw axis) of the vehicle 1 by dividing Vw1a_y with the distance L3 along the X axis between the ground contact point of the first motion unit 3 and the cornering center. In this case, the process unit 82 determines the distance L3 in dependence on the estimated value Vb_estm1_x of the traveling speed of the representative point or the gravitational center of the vehicle 1 along the X axis.

The cornering center means the center of rotation of the vehicle 1 around the yaw axis defined with respect to the floor surface over which the vehicle 1 or the first motion unit 3 travels.

In the illustrated embodiment, the cornering movement of the vehicle 1 takes place such that the vehicle 1 turns around the yaw axis which is located to the rear of the ground contact point of the first motion unit 3 (or to the rear of the vehicle operator seated on they saddle unit 5). When Vb_estm1_x is zero, the distance L3 along the X axis between the cornering center and the ground contact point of the first motion unit 3 is defined such that the cornering center is located near the ground contact point of the second motion unit 4. For instance, the distance L3 is defined to be equal to or substantially equal to the distance between the ground contact point of the first motion unit 3 and the ground contact point of the second motion unit 4.

When Vb_estm1_x is positive or when the vehicle 1 is traveling forward, the distance L3 may be selected such that with an increase in the absolute value of Vb_estm1_x, the cornering center moves from the ground contact point of the second motion unit 4 toward the ground contact point of the first motion unit 3 (or the position of the cornering center along the X axis moves toward the point located directly under the vehicle operator seated on the saddle unit 5 or the position of the vehicle occupant projected onto the floor surface). In other words, as the absolute value of Vb_estm1_x increases, the distance L3 decreases progressively. However, the distance L3 has a lower limit value (>0), and is prevented from being less than this limit value.

When $Vb\_estm1\_x$ is negative or when the vehicle 1 is traveling rearward, the distance L3 may be selected as the same value as when $Vb\_estm1\_x$ is zero or as a value which increases with an increase in the absolute value of $Vb\_estm1\_x$.

The target cornering angular speed $\omega z\_cmd\_gc$ is thus determined by dividing $Vw1\_y$ with the distance L3 determined from $Vb\_estm1\_x$. The target cornering angular speed $\omega z\_cmd\_gc$ is a counter clockwise rotation when the $Vw1\_y$ is a leftward movement, and clockwise rotation when the $Vw1\_y$ is a rightward movement.

Thereafter, a process is executed by a process unit 83 in the second control process unit 25. The process unit 83 determines a relative traveling speed $\Delta Vw2\_cmd\_y$ of the second motion unit 4 along the Y axis relative to the first motion unit 3 when the vehicle 1 undergoes a cornering movement at the target cornering angular speed $\omega z\_cmd\_gc$ by multiplying the minus value (−L) of the predetermined distance L between the ground contact point of the first motion unit 3 and the ground contact point of the second motion unit 4 to the target cornering angular speed $\omega z\_cmd\_g$ determined by the process unit 82.

The relative traveling speed $\Delta Vw2\_cmd\_y$ of the second motion unit 4 along the Y axis is zero when $\omega z\_cmd\_gc=0$ or when there is no cornering command. The relative traveling speed $\Delta Vw2\_cmd\_y$ of the second motion unit 4 along the Y axis consists of a rightward speed when $\Delta Vw2\_cmd\_y$ corresponds to a counter clockwise cornering angular speed, and a leftward speed when $\Delta Vw2\_cmd\_y$ corresponds to a clockwise cornering angular speed. Therefore, where there is a cornering command, $\Delta Vw2\_cmd\_y$ is an opposite in sign to $Vw1a\_y$ or $Vb\_estm1\_y$.

Thereafter, a process is executed by a process unit 84 in the second control process unit 25. The process unit 84 determines a base value $Vw2\_cmda\_y$ (current value) of the second target speed $Vw2\_cmd\_y$ of the second motion unit 4 along the Y axis by adding the relative traveling speed $\Delta Vw2\_cmd\_y$ of the second motion unit 4 along the Y axis to the first target speed $Vw1\_cmd\_y$ (current value) of the first motion unit 3 along the Y axis determined by the first control process unit 24.

Based on the thus determined $Vw2\_cmd\_y$, the second control process unit 25 controls the electric motor 17 serving as the drive unit for the second motion unit 4. More specifically, the second control process unit 25 determines the electric current command value of the electric motor 17 by performing a feedback control process such that the actual rotational speed $Nm\_c$ (measured value) of the electric motor 17 follows the target value of the rotational speed $Nm\_c$ corresponding to the second target speed $Vw2\_cmd\_y$, and the electric motor 17 receives the supply of electric current according to this electric current command value.

The control process of the second control process unit 25 is performed as discussed above. As a result, the second target speed $Vw2\_cmd\_y$ of the second motion unit 4 along the Y axis is essentially determined by adding the relative traveling speed $\Delta Vw2\_cmd\_y$ to the first target speed $Vw1\_cmd\_y$ (current value) of the first motion unit 3 along the Y axis.

When the absolute value of the estimated value $Vb\_estm1\_y$ of the traveling speed of the overall gravitational center of the vehicle along the Y axis is sufficiently small, and it can be judged that there is no cornering command, then it can be determined that $\Delta Vw2\_cmd\_y=0$. Therefore, under such a condition, the second target speed $Vw2\_cmd\_y$ of the second motion unit 4 along the Y axis is essentially equal to the first target speed $Vw1\_cmd\_y$ of the first motion unit 3 along the Y axis.

When the absolute value of the estimated value $Vb\_estm1\_y$ of the traveling speed of the overall gravitational center of the vehicle along the Y axis is relatively great, and it can be judged that there is a cornering command, then $\Delta Vw2\_cmd\_y$ is determined as a speed which is opposite in direction to $Vb\_estm1\_y$. Therefore, under such a condition, the second target speed $Vw2\_cmd\_y$ of the second motion unit 4 along the Y axis is determined as a value which is smaller than $Vw1\_cmd\_y$ (zero or a speed near zero value) which is in the same direction as the first target speed $Vw1\_cmd\_y$ of the first motion unit 3 along the Y axis, or a value which is opposite in sign to the first target speed $Vw1\_cmd\_y$ of the first motion unit 3.

Thus, the vehicle 1 of the illustrated embodiment is enabled to move in the X axis direction as a translational movement according to the forward and rearward command produced by the fore and aft tilting movement (in the X axis direction) of the base frame 2 caused by the corresponding leaning motion of the vehicle operator seated on the saddle unit 5.

The present invention has been described in terms of a specific embodiment, but the present invention is not limited by the illustrated embodiment, and can be modified in various ways without departing from the spirit of the present invention. For instance, the vehicle 1 may be equipped with an operation member such as a joystick in addition to being operated by the shifting of the weight of the vehicle operator. The vehicle 1 of the illustrated embodiment was provided with the second motion unit 4 to enable the vehicle to corner in a smooth manner, but may also be not provided with such a motion unit.

In the foregoing embodiment, the tilt command for notification $M\_xy$ was generated in regards to both the X axis and Y axis directions, and the tilt vibration command for notification $M1\_xy$ and the tilt angle command for notification $M2\_xy$ were generated in regards to both the X axis and Y axis directions to be superimposed on the corresponding target tilt command $M\_cmd\_xy$. However, it is also possible to consider only one of the directions, to set the tilt command for notification $M\_y$ in regard to the Y axis direction to be superimposed on the target tilt command $M\_cmd\_y$ in regard to the Y axis direction when the state information of the vehicle 1 indicates that the prescribed upright control tolerance range has been exceeded in regard to the X axis direction, or, conversely, to set the tilt command for notification $M\_x$ in regard to the X axis direction to be superimposed on the target tilt command $M\_cmd\_x$ in regard to the X axis direction when the state information of the vehicle 1 indicates that the prescribed upright control tolerance range has been exceeded in regard to the Y axis direction.

Furthermore, when the state information of the vehicle 1 indicates that the prescribed upright control tolerance range R has been exceeded in regard to the X axis or the Y axis direction, a tilt command for notification $M\_z$ around the yaw axis may be generated to be superimposed on the target cornering angular speed $\omega z\_cmd\_gc$. In such a case, of the notification tilt command M, a notification tilt vibration command M1 around the yaw axis may be advantageously utilized, but the notification tilt angle command M2 around the yaw axis may not be desirable because it could increase the risk of the vehicle causing some difficulty for the vehicle operator to control the vehicle.

Lastly, the various items of numerical data, components, layouts, positions in regards to various components of the present invention may be modified, omitted and substituted without departing from the spirit of the present invention.

Glossary of Terms 1 vehicle (inverted pendulum vehicle)
2 base frame
3 first motion unit
20 control unit
24 first control process unit
34 attitude control computation unit
70 acceleration sensor
71 angular speed sensor (state information acquiring unit)
72a, 72b rotational speed sensor (state information acquiring unit)
73 rotational speed sensor (state information acquiring unit)
DD_x deceleration target speed (amount corresponding to the tilt angle of the base frame)
DVw1_cmd_xy target translational acceleration (amount corresponding to the target tilt angle of the base frame)
M_xy tilt command for notification
M1_xy tilt vibration command for notification
M2_xy tilt angle command for notification
M_cmd_xy target tilt command
R upright control tolerance range
Vb_estm1_xy estimated value of the speed of the overall center of gravitational center
Vb_cmpn_cmd_xy gravitational center deviation compensated gravitational center target speed
θb_act_xy actual tilt angle of the base frame 2
Nm_xy rotational speed of the electric motor

The invention claimed is:

1. A control unit for an inverted pendulum vehicle that includes a base frame and a motion unit configured to travel on a floor surface and supporting the base frame, the control unit comprising:
a state information acquiring unit for acquiring state information of the vehicle; and
a control process unit for controlling the motion unit according to the state information acquired by the state information acquiring unit;
wherein the control process unit includes a target tilt command computation unit for computing a target tilt command for the base frame, and an attitude control computation unit for computing a target translational speed for fulfilling the target tilt command; and
when the state information has deviated from a prescribed upright control tolerance range, the target tilt command computation unit generates a tilt command for notification as a tilt vibration having an amplitude according to a deviation amount of the acquired state information from the upright control tolerance range, and superimposes the tilt command for notification onto the target tilt command.

2. The control unit for an inverted pendulum vehicle according to claim 1, wherein the tilt vibration has an amplitude proportional to the deviation amount of the acquired state information from the upright control tolerance range.

3. A control unit for an inverted pendulum vehicle that includes a base frame and a motion unit configured to travel on a floor surface and supporting the base frame, the control unit comprising:
a state information acquiring unit for acquiring state information of the vehicle; and
a control process unit for controlling the motion unit according to the state information acquired by the state information acquiring unit;
wherein the control process unit includes a target tilt command computation unit for computing a target tilt command for the base frame, and an attitude control computation unit for computing a target translational speed for fulfilling the target tilt command;
wherein when the state information has deviated from a prescribed upright control tolerance range, the target tilt command computation unit generates a tilt command for notification, and superimposes the tilt command for notification onto the target tilt command; and
wherein the target tilt command computation unit generates the tilt command for notification as a sinusoidal tilt vibration of a prescribed frequency.

4. The control unit for an inverted pendulum vehicle according to claim 1, wherein the state information includes at least one of a traveling speed of the vehicle, a tilt angle of the base frame and an operation speed of the motion unit, and the target tilt command computation unit starts superimposing the tilt command for notification onto the target tilt command when at least one of the traveling speed of the vehicle, the tilt angle of the base frame and the operation speed of the motion unit has deviated from a prescribed corresponding upright control tolerance range.

5. The control unit for an inverted pendulum vehicle according to claim 1, wherein the state information includes at least two of a traveling speed of the vehicle, a tilt angle of the base frame and an operation speed of the motion unit, and the target tilt command computation unit ceases superimposing the tilt command for notification onto the target tilt command when all of the at least two of the traveling speed of the vehicle, the tilt angle of the base frame and the operation speed of the motion unit have ceased to deviate from prescribed corresponding upright control tolerance ranges.

6. The control unit for an inverted pendulum vehicle according to claim 1, wherein the target tilt command computation unit generates the tilt command for notification as a command to tilt the base frame by a prescribed angle in the opposite direction to the traveling direction of the vehicle.

7. A control unit for an inverted pendulum vehicle that includes a base frame and a motion unit configured to travel on a floor surface and supporting the base frame, the control unit comprising:
a state information acquiring unit for acquiring state information of the vehicle; and
a control process unit for controlling the motion unit according to the state information acquired by the state information acquiring unit;
wherein the control process unit includes a target tilt command computation unit for computing a target tilt command for the base frame, and an attitude control computation unit for computing a target translational speed for fulfilling the target tilt command;
wherein when the state information has deviated from a prescribed upright control tolerance range, the target tilt command computation unit generates a tilt command for notification, and superimposes the tilt command for notification onto the target tilt command;
wherein the target tilt command computation unit generates the tilt command for notification as a command to tilt the base frame by a prescribed angle in the opposite direction to the traveling direction of the vehicle;

wherein the state information includes a tilt angular acceleration of the base frame, and wherein when the tilt angular acceleration of the base frame has deviated from a prescribed upright control tolerance range, the target tilt command computation unit generates the tilt command for notification such that the tilting of the base frame by the prescribed angle occurs with a delay of a prescribed time constant, and when the tilt angle of the base frame has reached the prescribed angle, the target tilt command computation unit generates the tilt command for notification such that the tilting of the base frame may be returned to an original angle with a delay of a prescribed time constant.

8. The control unit for an inverted pendulum vehicle according to claim 7, wherein the attitude control computation unit computes the target translational speed such that a gravitational center target speed computed by the control process unit as well as the target tilt angle command may be achieved, and the control process unit sets the gravitational center target speed such that the tilt angle of the base frame becomes zero when the tilt angle of the base frame has reached a prescribed stopper angle.

9. The control unit for an inverted pendulum vehicle according to claim 8, wherein when the tilt angle of the base frame has reached the prescribed stopper angle, the attitude control computation unit determines the gravitational center target speed so as to put the tilt angle of the base frame back to zero with a time delay of a prescribed time constant, and upon setting of the gravitational center target speed by the control process unit to put the tilt angle of the base frame back to an original angle, the attitude control computation unit determines the gravitational center target speed so as to put the tilt angle of the base frame back to the original angle with a time delay of a prescribed time constant.

* * * * *